US010462359B1

United States Patent
Rajvanshi et al.

(10) Patent No.: US 10,462,359 B1
(45) Date of Patent: Oct. 29, 2019

(54) IMAGE COMPOSITION INSTRUCTION BASED ON REFERENCE IMAGE PERSPECTIVE

(71) Applicant: Adobe Inc., San Jose, CA (US)

(72) Inventors: Tushar Rajvanshi, Meerut (IN); Sourabh Gupta, Noida (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/953,311

(22) Filed: Apr. 13, 2018

(51) Int. Cl.
*H04N 5/232* (2006.01)
*G06K 9/62* (2006.01)
*G06K 9/00* (2006.01)
*G01S 19/51* (2010.01)

(52) U.S. Cl.
CPC ..... *H04N 5/23222* (2013.01); *G06K 9/00664* (2013.01); *G06K 9/6215* (2013.01); *H04N 5/23216* (2013.01); *H04N 5/23293* (2013.01); *G01S 19/51* (2013.01)

(58) Field of Classification Search
CPC .......... H04N 5/23222; H04N 5/23216; H04N 5/23293; G06K 9/00664; G06K 9/6215; G01S 19/51
See application file for complete search history.

(56) References Cited

U.S. PATENT DOCUMENTS

| | | | |
|---|---|---|---|
| 7,414,658 B2* | 8/2008 | Ariga | H04N 1/0035 348/231.3 |
| 2014/0080428 A1* | 3/2014 | Rhoads | H04W 4/70 455/88 |
| 2015/0104113 A1* | 4/2015 | Ugur | G06K 9/34 382/283 |
| 2016/0080643 A1* | 3/2016 | Kimura | H04N 5/23206 348/207.1 |
| 2016/0142625 A1* | 5/2016 | Weksler | H04N 5/23222 348/222.1 |
| 2017/0374280 A1* | 12/2017 | Chan | H04N 5/23222 |

* cited by examiner

*Primary Examiner* — Amy R Hsu
(74) *Attorney, Agent, or Firm* — SBMC

(57) ABSTRACT

In implementations of image composition instruction based on reference image perspective, a template image of a desired object is captured. Reference images including a similar or same object as the desired object are obtained. Directions from a first location of where a template image was captured to a second location where a selected reference image was captured are obtained and exposed in a user interface to allow a user to move to the second location. At the second location, interactive instructions are generated based on a live video stream of the desired to move a camera capturing the video stream until a composition of the video stream is aligned with a composition of the reference image. The camera is configured with settings based on the reference image to capture a composed image having a same composition as the reference image.

20 Claims, 11 Drawing Sheets

IMAGE COMPOSITION INSTRUCTION BASED ON REFERENCE IMAGE PERSPECTIVE

BACKGROUND

The proliferation of digital cameras integrated into computing devices (e.g., cameras included in a smart phone) and the improvements in the quality of the cameras has resulted in a proliferation of amateur photographers having daily opportunities to capture images. Unfortunately, lacking the proper photography training (e.g., experience, attendance of photography classes, textbook study, and the like), images captured by most amateur photographers are usually of poor quality, despite desirable subject matter of the captured images. For instance, an amateur photographer may capture an image of an historic monument, such as the Eiffel tower, but when compared to other images of the historic monument captured by more experienced photographers, the amateur photographer's image often appears of poor quality.

There are many reasons for these shortcomings, including the amateur photographer's lack of knowledge of capture location (e.g., where to capture the image from, such as where to stand relative to an object in an image), elevation (e.g., how high to hold the camera), angle (e.g., how to rotate the camera), and the like needed to capture an image with a desirable composition, such as how objects appear relative to one another in the captured image. Furthermore, a lack of knowledge of how to configure camera settings, such as aperture, shutter speed, white balance, and ISO (a measure of the sensitivity of a camera's image sensor often equated with film speed of film cameras) also contribute to a general poor quality and composition of many images captured by an amateur photographer, despite the technological improvements of modern digital cameras.

A variety of image editing applications exist to edit an image, such as Adobe's Photoshop® application. However, rather than providing instructions for image composition at the time of image capture, image editing applications are used to post-process a captured image. Therefore, these image editing applications are limited in terms of changing the composition of an image after the image has been captured and the photographer has left the area in which the image was captured. Accordingly, an amateur photographer may process an image with one of these image editing applications, but still not understand how to compose and capture an image of the same subject matter like an experienced, professional photographer.

SUMMARY

Techniques, systems, and devices are described to provide interactive image composition instruction based on reference image perspective. A template image is captured by a camera device, such as a digital camera, a tablet or smartphone having a digital camera, or other type of computing device with an integrated camera. Reference images including a same or similar object as an object in the template image, such as determined by extracting content features from the template image and matching them to content features of images in a database, are obtained. Representations of the reference images are displayed on a user interface of the computing device (e.g., thumbnail images of the reference images). A user selection of one of the reference images is received, such as caused by a user selecting a representation of one of the reference images by tapping on a touchscreen where the representation is exposed. The reference images include metadata indicating a location (e.g., global positioning system (GPS) coordinates) of where a respective reference image was taken and settings of the capture device used to capture the respective reference image. It is determined whether the location of the computing device where the template image was captured matches a location of a reference image selected by a user. When the locations do not match, directions from a location of the computing device where the template image was captured to a location of the selected reference image (e.g., a location where the selected reference image was captured) are obtained and exposed in a user interface.

Based on the directions, the user moves to the location of the selected reference image, such as by walking or driving to the location. At the location of the selected reference image, a video stream is generated with a camera of a computing device. The video stream includes an object also included in the template image (e.g., an historical monument or building that is desired to be photographed). Interactive instructions are generated for adjusting a perspective of the computing device to a position, such as by adjusting the elevation, placement, angle, and orientation of the computing device, until a composition of the video stream aligns with a composition of the selected reference image. For instance, the instructions may include displaying a first indicator of a composition of the video stream and a second indicator of a composition of the reference image, and matching the composition of the video stream to the composition of the reference image may be determined by aligning the first indicator with the second indicator. A composed image including the object included in the template image is captured based on the position of the computing device when the composition of the video stream aligns with the composition of the selected reference image, and the settings of the capture device used to capture the selected reference image. Hence, a composed image is captured with a same composition as a reference image selected by a user.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
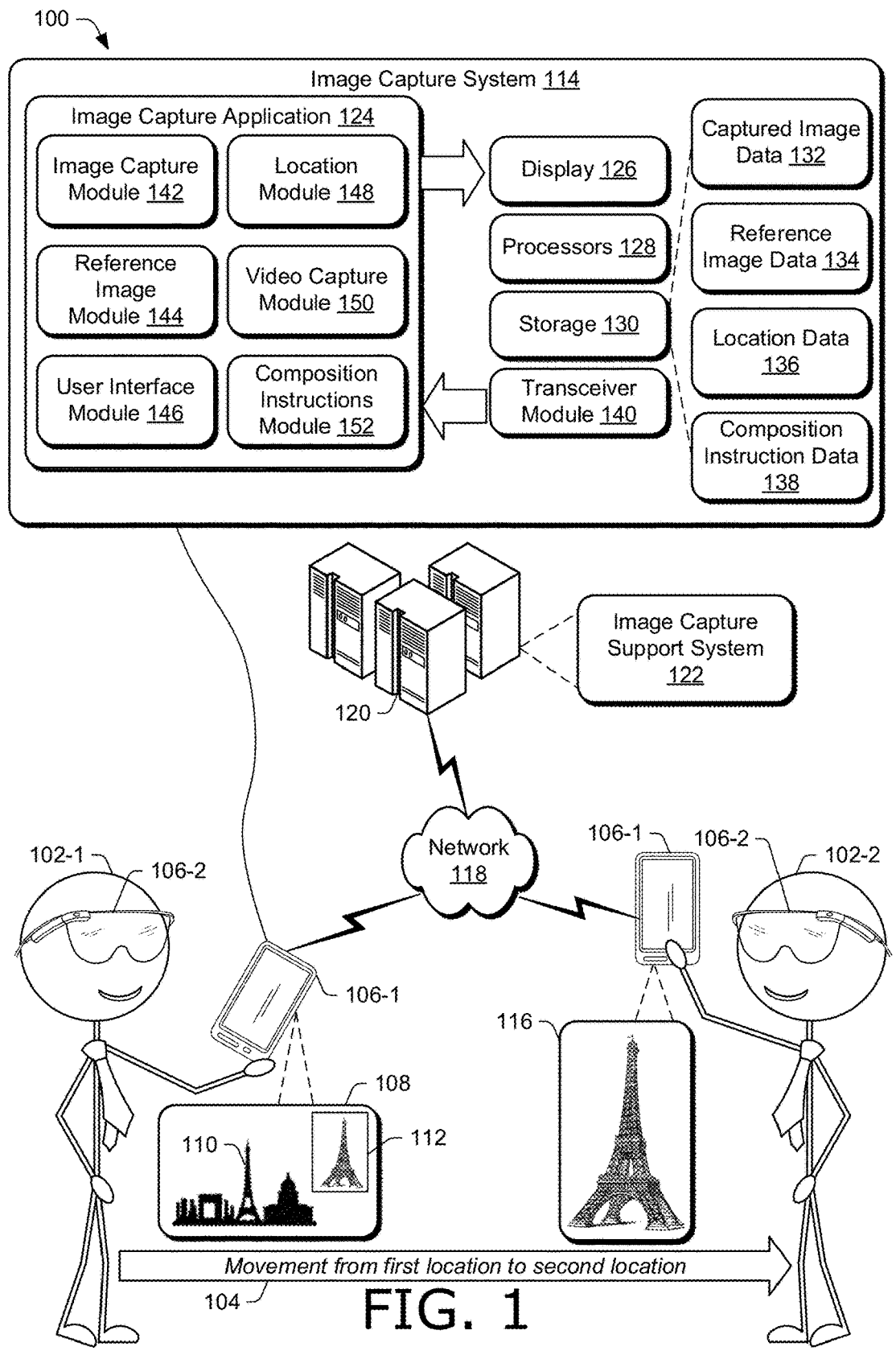
FIG. 1 illustrates a digital medium environment in an example implementation that is operable to employ techniques described herein.

Because of the proliferation of mobile computing devices having high-quality cameras, the world is replete with amateur photographers. Unfortunately, most amateur photographers lack the understanding needed for capturing an image with a desired composition (composition refers to how objects appear relative to one another and the framing of the captured image). For instance, most amateur photographers lack understanding of location (e.g., where to capture the image from, including where to stand relative to an object in an image), elevation (e.g., how high to hold the camera), angle (e.g., how to rotate and orient the camera), camera configuration settings (e.g., aperture, shutter speed, white balance, and ISO), needed to capture an image with a desired composition. Though many image editing applications are available, such as Adobe's Photoshop® application, these image editing applications post-process a captured image, rather than provide instructions for composing an image at the time of image capture. Therefore, these image editing applications are limited in terms of affecting the composition of an image.

Accordingly, this disclosure describes systems, techniques, and devices for providing image composition instruction based on reference image perspective when an image is captured (e.g., at the time of capture, rather than post-processing of a captured image). A template image is captured by a computing device, such as a tablet or smartphone including an integrated digital camera. The template image includes an object of interest to be photographed, such as an historic landmark, building, landscape, structure, and the like. Reference images matching the template image are obtained, such as reference images that include subjects that are similar to or the same as the object of the template image. For instance, a template image may include a statue, and reference images may include images of the same statue as the statue in the template image, images with statues that are similar to the statue in the template image, such as a duplicate or miniature statue of the statue in the template image, combinations thereof, and the like. Reference images are obtained in any suitable way, such as from a database of stock photos, from results of a search query, from an asset store, and the like. The reference images include metadata indicating a location (e.g., GPS coordinates) of where a respective reference image was taken and settings of the capture device, such as a digital camera, film camera, video camera, and the like used to capture the respective reference image. In one example, reference images are determined to match a template image based on a location associated with the template image (e.g., GPS coordinates of where the template image was captured). Images from a database, search results, and the like having respective locations near (e.g., within a distance threshold, such as 3 miles) a location associated with the template image may be determined to be reference images. Additionally or alternatively, reference images may be determined by matching content features (e.g., shapes, patterns, colors, etc.) extracted from a template image to content features extracted from images from a database, search results, and the like. In one example, reference images are determined from ratings of images in a database, search results, asset store, and the like, such as ratings that indicate an amount of approval of an image.

Representations of the reference images are exposed in a user interface of a computing device (e.g., thumbnail images of the reference images may be displayed overlaid or proximate a template image). A user selection of one of the reference images is received. For instance, a user may tap on a representation of one of the reference images to select one of the reference images. The selected reference image may contain a same object in a template image (e.g., the Eiffel tower), but be composed differently than the template image, such as taken from a different location than the template image. In one example, reference images include subjects that are similar to an object in a template image. For instance, reference images can include suggestions of objects that are similar to an object in a template image, such as images of other towers in Paris near the Eiffel tower when the template image includes the Eiffel tower.

It is determined whether a location of the computing device where the template image was captured matches a location of a selected reference image. For instance, GPS data from a template image may be compared to GPS data of a selected reference image and be determined to match if the distance between the two sets of GPS data is less than a location threshold, such as 1 meter. When the locations match, interactive composition instructions are generated and exposed in a user interface (discussed below in more detail). When the locations do not match, directions from the location where the template image was captured to the location of the selected reference image are obtained and exposed in a user interface, so that a user is shown where to move to compose an image that matches a selected reference image. Directions can be any suitable directions, such as a map (e.g., aerial photograph, illustrated map, walking directions, combinations thereof, and the like). In one example, directions include at least one of an estimated travel time, distance, and suggested route from a location where the template image was captured to a location of the selected reference image.

Based on the directions, the user moves to the location of a selected reference image, such as by walking or driving to the location. At the location of the selected reference image, a video stream is generated with a computing device. A computing device used to generate a video stream may be a same device or different device used to capture a template image. A video stream is a "live video feed" (e.g., the video stream includes a sequence of images generated and exposed in real time, without perceptible delay to a user) that includes an object also included in the template image, such as an historical monument, building, landscape, and the like that is desired to be photographed.

Interactive instructions are generated for adjusting a perspective of a computing device capturing the video stream (e.g., elevation, placement, angle, orientation, and the like) to a position until a composition of the video stream aligns with a composition of a selected reference image. In one example, instructions include displaying a first indicator of the composition of a video stream and a second indicator of the composition of a selected reference image (e.g., a target composition). The first indicator and second indicator can be any suitable indicator, such as cross-hairs, axes, geometric shapes, arrows, numbers, combinations thereof, and the like. A user moves the computing device generating a video stream and the interactive instructions are updated as the computing device is moved (e.g., indicators are updated and exposed in a user interface). For instance, a user may move a computing device by changing the elevation, horizontal position, rotation about any axes, combinations thereof, and the like, of the computing device. Responsive to the movement, indicators are updated and updated indicators are exposed in a user interface. The composition of the video stream is determined to match the composition of the selected reference image when the first indicator is aligned with the second indicator, such as by placing cross-hairs of the first indicator on top of, or coincident with, cross-hairs of the second indicator. Alignment can be indicated in any suitable way, such as by changing a color of an indicator, changing the geometry of an indicator (e.g., adding a circle, square, or star), exposing a message (e.g., "Successful Composition Achieved"), combinations thereof, and the like.

In one example, first features are extracted from a video stream, and second features are extracted from a selected reference image. A homography matrix (e.g., a 4×4 matrix) to map locations and orientations of respective ones of the first features in the video stream to locations and orientations of the second features in a selected reference image is determined. The homography matrix can be used to generate at least one of an indicator of the composition of a video stream and an indicator of the composition of a selected reference image. Additionally or alternatively, gyroscopic settings of the computing device capturing a video stream are determined, and at least one of an indicator of the composition of a video stream and an indicator of the composition of a selected reference image can be based on the gyroscopic settings.

A composed image is captured based on the position of the computing device when the composition of a video stream aligns with the composition of a selected reference image. For instance, the computing device may be maintained at the position when the composition of a video stream aligns with the composition of a selected reference image, and a composed image is captured at this position. Additionally or alternatively, settings of a capture device used to capture a selected reference images are obtained. Settings can be included in metadata of reference images, and exposed in a user interface. In one example, settings of a selected reference image are exposed responsive to alignment of the composition of a video stream with the composition of a selected reference image. Accordingly, a user may configure the settings of the computing device to match the settings of a selected reference image at a same location used to capture the selected reference image. Hence, a composed image is captured with a comparable composition to a selected reference image.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102-1 at a first position and a user 102-2 at a second position (collectively user 102). For instance, a user at a first position (represented by user 102-1) moves to a second position (represented by user 102-2), and the movement is indicated by arrow 104 in FIG. 1. User 102-1 may be a same user as 102-2 or a different user than user 102-2.

User 102 has at least one computing device (e.g., a mobile device) having an image capture device (e.g., a digital camera, video camera, and the like). In the example in FIG. 1, user 102 is illustrated as having two computing devices, computing devices 106-1 and 106-2 (collectively 106). For instance, computing device 106-1 depicts a tablet and computing device 106-2 depicts a pair of eye glasses (e.g., smart goggles). Computing devices 106 are example computing devices, and any suitable computing device is contemplated, such as a mobile phone, tablet, laptop computer, desktop computer, gaming device, goggles, glasses, camera, digital assistant, wearable device (e.g., watch, arm-band, adhesive patch, etc.), echo device, image editor, non-linear editor, digital audio workstation, copier, scanner, and the like. Furthermore, discussion of one of computing devices 106 is not limited to that computing device, but generally applies to each of the computing devices 106. Moreover, computing devices 106 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 106. For example, computing devices 106 can recognize input as being a mouse input, stylus input, touch input, input provided through a natural user interface, and the like. Thus, computing devices 106 can recognize multiple types of gestures including touch gestures and gestures provided through a natural user interface. In one example, computing devices 106 include speech recognition, identification, and synthesis functionalities, microphones, and speakers that allow computing devices 106 to communicate with user 102 in a conversation. Moreover, computing devices 106 include an image capture device (e.g., a camera) configured to capture images and video streams.

Figure 11:
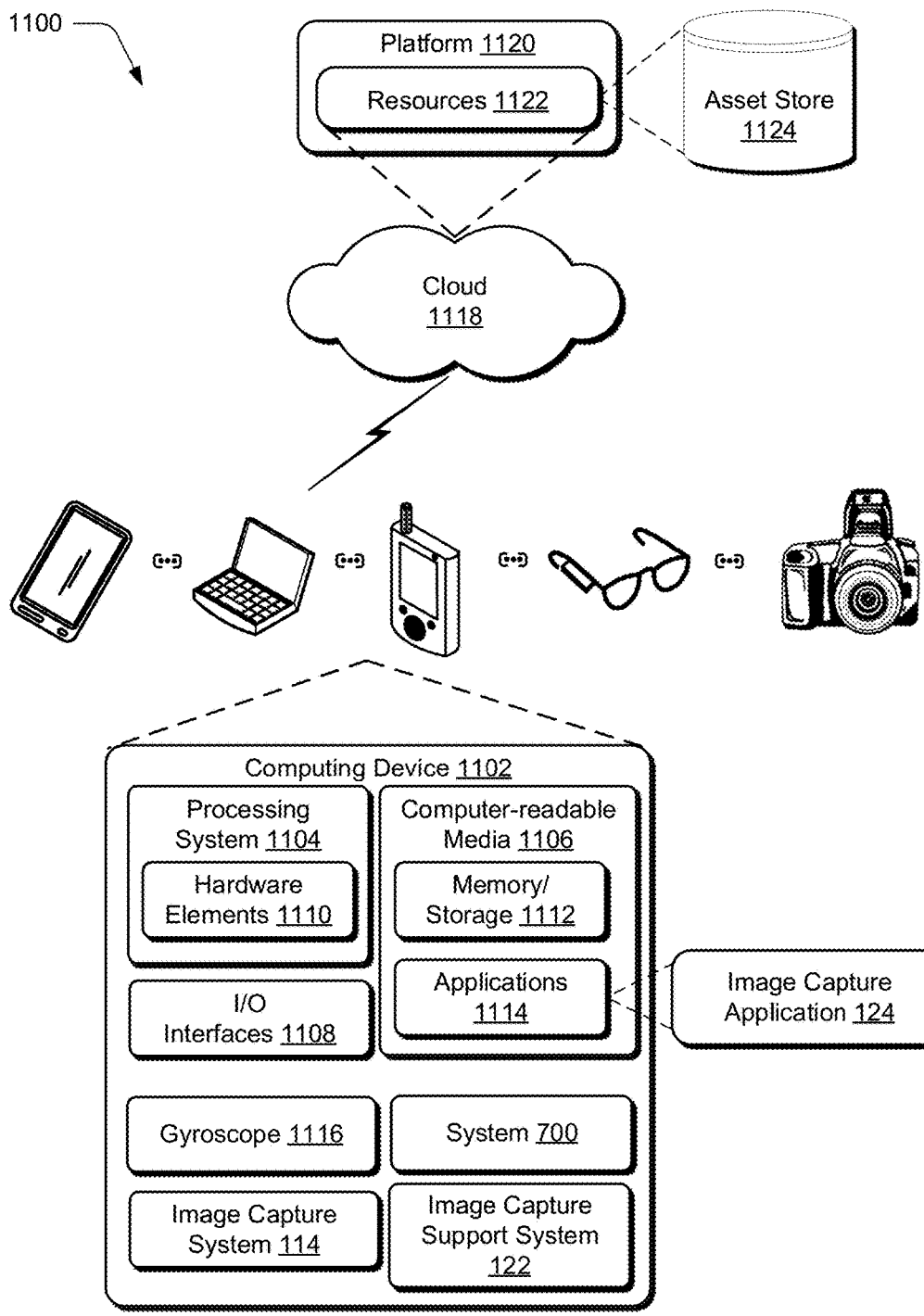
FIG. 11 illustrates an example system including various components of an example device that can be implemented as any type of computing device as described and/or utilized with reference to FIGS. 1-10 to implement aspects of the techniques described herein.

Furthermore, computing devices 106 may be representative of one or a plurality of different devices, such as one or more devices connected to a network that perform operations "over the cloud" as further described in relation to FIG. 11. In one example, computing devices 106 are communicatively coupled to each other, such as with a low power wireless communication standard (e.g., a Bluetooth® protocol). For instance, computing device 106-1 can communicate wirelessly with computing device 106-2. Hence, an image generated or stored on one device (e.g., computing device 106-1) can be communicated to, and displayed on another device (e.g., computing device 106-2).

In the example illustrated in FIG. 1, user 102-1 captures a template image with computing device 106-1, and the template image is exposed in a user interface 108. User interface 108 exposes template image 110, illustrating a landscape scene of Paris including the Eiffel tower. User interface 108 also exposes representation 112 of a reference image. For clarity, only one representation 112 is shown in FIG. 1, though any suitable number of representations of reference images can be exposed in user interface 108. Representation 112 includes a thumbnail image of the Eiffel tower, and is determined with image capture system 114 included in computing device 106-1. Image capture system 114 can determine reference images in any suitable way, such as based on locations of reference images with respect to a location of where template image 110 is captured, ratings of reference images (e.g., numbers of likes, dislikes, stars, and the like), features extracted from template image 110 that match with features of the reference images, combinations thereof, and the like.

Furthermore, image capture system 114 can obtain reference images responsive to any suitable stimulus, such as responsive to a user selection to find reference images, responsive to capturing template image 110, responsive to computing device 106-1 being proximate to a location of a reference image (e.g., when computing device 106-1 is within 2 miles of the Eiffel tower, image capture system 114 can obtain reference images of the Eiffel tower), and the like. Accordingly, image capture system 114 can obtain reference images automatically and without user intervention. Additionally or alternatively, image capture system 114 can obtain reference images responsive to a user request to obtain reference images.

In the example in FIG. 1, user 102-1 selects representation 112 of a reference image (e.g., from among a plurality of displayed representations), and image capture system 114 obtains directions from a location of user 102-1 (e.g., a first location) to a location associated with representation 112 (e.g., second location), such as GPS data corresponding to where the reference image of representation 112 was captured. Directions can be any suitable directions, such as walking directions, driving directions, options for public transportation, directions to a nearest taxi, train, or bus, combinations thereof, and the like.

Based on directions obtained with image capture system 114, user 102-1 moves form a first location to a second location, illustrated by user 102-2 at the second location. Movement from the first location to the second location is illustrated by arrow 104. In the example in FIG. 1, the second location is closer to the Eiffel tower than the first location where template image 110 was captured, and corresponds to the location (e.g., GPS coordinates) where the reference image of representation 112 was captured. At the second location, user 102-2 enables computing device 106-1 to capture a video stream. Using the video stream and gyroscopic settings of computing device 106-1 at the second location, image capture system 114 generates interactive instructions to move and orient computing device 106-1 so that the composition of an image to be captured by computing device 106-1 matches the composition of the reference image of representation 112, In FIG. 1, this movement of computing device 106-1 according to the interactive instructions is illustrated by user 102-2 raising and rotating computing device 106-1 relative to the position of computing device 106-1 held by user 102-1.

Furthermore, image capture system 114 obtains settings such as aperture, shutter speed, white balance, and ISO of a capture device used to capture a reference image of representation 112. Accordingly, user 102-2 can configure computing device 106-1 at a same location where a selected reference image was taken and in a same manner used to capture the reference image (e.g., with the same configuration settings), and therefore capture an image with a same composition of the selected reference image. In FIG. 1, user 102-2 captures composed image 116 based on interactive instructions and configuration settings from image capture system 114. Composed image 116 has a composition matching the composition of the reference image of representation 112.

Computing devices 106 are also coupled to network 118. Network 118 communicatively couples computing devices 106 with server 120 (for clarity, only computing device 106-1 is illustrated in FIG. 1 as coupled to network 118, though computing device 106-2 can also be coupled to server 120 via network 118). Network 118 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 120 may include one or more servers or service providers that provide services and/or resources to computing devices 106. Generally, resources provided by server 120 may be licensed, purchased, or may be made freely available, (e.g., without authentication, license, or account-based access). The resources can include any suitable combination of services and content, such as made available over network 118 by one or more providers. Some examples of services include, but are not limited to, an on-line shopping service, a photo editing service, an image database (e.g., including reference images), a web development and management service, a collaboration service, a social networking service, a messaging service, an advertisement service, a graphics design service, an image storage service (including storage and access of photos, documents, records, files, and the like), and so forth. Content may include various combinations of assets, including videos, ads, audio, multimedia streams, animations, images, web documents, web pages, applications, device applications, text documents, drawings, presentations, stock photographs, user profiles, user preferences, user data (e.g., images stored in an image gallery), and the like.

Server 120 includes image capture support system 122 configurable to receive signals from computing devices 106, process the received signals, and send the processed signals to computing devices 106 to support providing instruction for image composition when an image is captured. For instance, computing device 106-1 may obtain a template image 110 and communicate it to server 120. Using image capture support system 122, server 120 can determine and obtain reference images matching template image 110, such as by matching features of images, locations of images, image ratings, combinations thereof, and the like, and communicate representations of the reference images back to computing device 106-1 to be displayed on user interface 108. A user selection of a reference image can be communicated to server 120 from computing device 106-1, and server 120 can provide directions from a location where the template image was captured to a location of where the selected reference image was captured. Additionally or alternatively, computing device 106-1 captures a video stream and communicates it to server 120, and server 120 provides interactive instructions to computing device 106-1 to adjust a position of computing device 106-1 that aligns a composition of the video stream captured by computing device 106-1 with a composition of the selected reference image. Accordingly, image capture support system 122 of server 120 can include a copy of image capture system 114, including image capture application 124 (discussed below in more detail).

Computing devices 106 include image capture system 114 to provide instructions for capturing a composed image, such as composed image 116, based on a location of a reference image, such as a reference image represented by representation 112. For clarity, computing device 106-1 is illustrated in FIG. 1 as including image capture system 114, though computing device 106-2 also include copies of image capture system 114 (not shown).

Image capture system 114 includes a display 126 for exposing user interfaces and displaying images, such as template image 110 and composed image 116. Display 126 can be any suitable type of display, such as a touchscreen, liquid crystal display, plasma display, head-mounted display, projector and screen, and the like. Display 126 can display any suitable interface, such as user interface 108. Image capture system 114 also includes processors 128. Hence, image capture system 114 may be implemented at least partially by executing instructions stored on storage 130 on processors 128. For instance, processors 128 may execute portions of image capture application 124.

Storage 130 can be any suitable type of storage accessible by or contained in image capture system 114. Storage 130 stores and provides access to and from memory included in storage 130 for any suitable type of data. For instance, storage 130 includes captured image data 132 (e.g., data associated with images, template images, composed images, video streams, metadata, features of images, feature thresholds (e.g., a number of features that must be matched to determine that an image matches a template image), user data describing a feature of an image, such as text input by a user describing an object in an image, a filename of an image that describes a feature in an image, and the like). Storage 130 also includes reference image data 134 (e.g., data associated with reference images, representations of reference images, rankings of reference images, features of reference images, feature thresholds (e.g., a number of features that must be matched to determine that a reference image matches a template image), text descriptions of reference images, configuration settings (e.g., aperture, shutter speed, ISO, white balance, etc.) of capture devices used to capture reference images, and the like). Storage 130 also includes location data 136 (e.g., data associated with locations of images, such as where an image was taken, GPS data, street address, map coordinates, grid coordinates, two-dimensional coordinates, three-dimensional coordinates, directions to travel from a first location to a second location, estimates of time and distance to travel from a first location to a second location, alternative routes, maps, satellite images, aerial images, street views, and the like). Storage 130 also includes composition instruction data 138 (e.g., data regarding interactive instructions for composing an image, such as indicators of the composition of a video stream, indicators of the composition of a reference image or target image, indicators for communicating that alignment between a video stream and a reference image is achieved, such as a text message or instructions to alter a displayed indicator, gyroscopic data of a computing device, homography matrices that map features from one image (or video stream) to features of another image, and the like).

Furthermore, image capture system 114 includes transceiver module 140. Transceiver module 140 is representative of functionality configured to transmit and receive data using any suitable type and number of communication protocols. For instance, data within image capture system 114 may be transmitted to server 120 with transceiver module 140. Furthermore, data can be received from server 120 with transceiver module 140. Transceiver module 140 can also transmit and receive data between computing devices 106.

Image capture system 114 also includes image capture application 124. Image capture application 124 includes image capture module 142, reference image module 144, user interface module 146, location module 148, video capture module 150, and composition instructions module 152. These modules work in conjunction with each other to provide instructions for capturing a composed image based on a reference image.

Furthermore, though the description of image capture system 114 and image capture application 124 describes capturing composed images (e.g., photographs), the systems, procedures, and devices described herein are not limited to capturing photographs, but are also operable to capture videos, scans, copies, and the like.

Image capture module 142 is representative of functionality configured to capture images, such as by generating a template image with a capture device, capturing a composed image, e.g., composed image 116, and the like. Accordingly, image capture module 142 includes or has access to a capture device, such as a digital camera, video camera, and the like. A capture device included in or accessed by image capture module 142 can be configurable with settings to adjust image capture, such as aperture, shutter speed, white balance, ISO, zoom level, filters (e.g., sepia filters, black and white filters, and the like).

In one example, image capture module 142 generates metadata for each image captured by image capture module 142. Metadata can include any suitable data, such as configuration settings used to capture an image, weather conditions (e.g., temperature, humidity, wind, and the like), location (e.g., GPS data, street address, and the like indicating where an image was captured), image resolution, user descriptions of features of an image (e.g., a user may enter the text "Eiffel tower" to indicate that an image includes the Eiffel tower, such as template image 110), features of images, and the like.

Additionally or alternatively, image capture module 142 can extract features of an image captured by image capture module 142. Image capture module 142 can extract any suitable features using any suitable feature extractor, such as a rotationally-invariant feature extractor, a scale-invariant feature extractor, combinations thereof, and the like. In one example, image capture module 142 extracts features of an image with an oriented fast and rotated brief (ORB) feature extractor. Additionally or alternatively, image capture module 142 extracts features of an image with a scale-invariant feature transform (SIFT).

An image captured by image capture module 142, along with any suitable information, such as metadata of an image, image sensor data, pixel data, zoom level, features extracted from an image, an indication whether a captured image is intended to be a template image for which reference images are to be obtained, such as indicated by a user selection to find reference images matching a captured image by image capture module 142, and the like, used by or calculated by image capture module 142 are stored in captured image data 132 of storage 130 and made available to modules of image capture application 124. In one example, an image captured by image capture module 142 is exposed in a user interface managed by user interface module 146.

Reference image module 144 is representative of functionality configured to obtain reference images, such as template image 110. Reference images can be any suitable images, such as images matching a template image (e.g., determined by matching content features), images including a subject determined to be a same object as an object in a template image (e.g., images that contain the Eiffel tower when the template image includes the Eiffel tower), images including a subject determined to be a similar object as an object in a template image (e.g., images that contain towers when the template image includes the Eiffel tower), images including a subject that is located near an object in a template image, combinations thereof, and the like.

Moreover, reference images can be obtained by reference image module 144 in any suitable way. In one example, reference images are obtained from a database of images, such as a database of stock photographs. For instance, server 120 in FIG. 1 may host a database of stock images. Additionally or alternatively, reference image module 144 obtains reference images from search results obtained by constructing a search query (e.g., a search string) and entering the search query into a search engine. A search query can be constructed in any suitable way, such as from descriptors of features (e.g., names of features of a template image captured by image capture module 142), a filename of a template image, user-entered text descriptors, image metadata, location information (e.g., GPS coordinates), and the like.

Reference image module 144 obtains features for reference images. In one example, reference image module 144 extracts features from reference images. Reference image module 144 can use any suitable feature extractor to extract features from reference images, such as a rotationally-invariant feature extractor, a scale-invariant feature extractor, combinations thereof, and the like. In one example, reference image module 144 extracts features of reference images with an ORB feature extractor. Additionally or alternatively, reference image module 144 extracts features of a reference image with a SIFT extractor. Moreover, reference image module 144 may extract features from a template image generated by image capture module 142. Additionally or alternatively, reference image module 144 may receive features of a template image from image capture module 142. In one example, features of a template image, whether received or extracted by reference image module 144, include user-entered features, such as the text "this image includes a picture of the Eiffel tower".

Reference images obtained by reference image module 144 can be any suitable image in any suitable format, file type, data structure, and the like. In one example, reference images obtained by reference image module 144 include metadata. Metadata of a reference image can include any suitable information regarding a reference image, such as configuration settings of a capture device used to capture the reference image (e.g., aperture, shutter speed, white balance, ISO, zoom level, applied filters, and the like), weather conditions (e.g., temperature, humidity, wind, and the like) when the reference image was captured, a location of where a reference image was captured (e.g., GPS data, a street address, grid coordinates, map coordinates, longitude and latitude, elevation, such as height above sea level, azimuth, combinations thereof, and the like), a binary indicator of whether a reference image includes a location, so that the reference image can be quickly searched to ascertain whether the reference image includes a location, a resolution of a reference image (e.g., number of pixels), descriptions of features included in a reference image (e.g., features extracted by a feature extractor of reference image module 144 and placed in a list of features grouped by categories of features, such as building features, landscape features, monument features, etc.), text information entered by the photographer, a photographer's name, an indication of licensing or sale status of a reference image, an indication of whether a reference image is a stock image, an indication of whether a reference image was taken by a professional photographer, ratings of a reference image (e.g., user ratings, a number of stars, a numerical value, such a number from one to five, a number of emoticons, such as "thumbs up" or "thumbs down" indicators, a number of likes or dislikes, a number of positive or negative comments, etc.), a representation of a reference image, such as a thumbnail image, and the like.

Furthermore, reference image module 144 can rank reference images obtained by reference image module 144. Reference image module 144 can rank reference images in any suitable way. In one example, reference images are determined to match a template image based on a location associated with the template image. For instance, reference images having locations (e.g., as indicated in metadata of a reference image) within a distance threshold, such as 3 miles, to a location of a template image can be determined to match a template image, and given a higher priority in a ranking of the reference images than reference images having locations outside the distance threshold.

Additionally or alternatively, reference images having respective locations within a distance threshold, such as 3 miles, to a location of a template image may be assigned a score, such as a number from one to ten, based on the distance from a location of a reference image to a location of a template image. For instance, the smaller the distance, the higher the score can be, determined according to any suitable mapping, such as a linear, quadratic, discrete, or non-linear function that maps a distance to a score. Reference images having a higher score can be given a higher priority in a ranking of the reference images by reference image module 144.

In one example, reference images are determined by matching features extracted from a template image (e.g., content features) to features extracted from images obtained by reference image module 144, and a ranking of the reference images by reference image module 144 is based on the matching features. For instance, reference image module 144 may determine reference images based on a feature threshold that defines a measure of features that must be matched to determine that a reference image matches a template image, such as a number of features, e.g., at least ten features must be matched, a percentage of features, e.g., at least 50% of extracted features from a template image must match features of a reference image, a type of feature, e.g., at least one geometric feature must be matched, such as a line or circle, combinations thereof, and the like. In one example, a ranking of reference images by reference image module 144 is based on the feature threshold and the measure of features. For instance, reference images having a higher number of matching features (e.g., twenty) to a template image are given a higher priority in the ranking than reference images having a lower number of matching features (e.g., ten). Additionally or alternatively, reference images having a higher percentage of matching features (e.g., 75%) to a template image are given a higher priority in the ranking than reference images having a lower percentage of matching features (e.g., 50%)

Additionally or alternatively, reference image module 144 ranks reference images based on a rating of respective reference images. For instance, reference images having higher user ratings (e.g., more stars, such as five stars) are given higher priority in the ranking of reference images than reference images having lower user ratings (e.g., fewer stars, such as three or less stars).

In one example, reference image module 144 ranks reference images based on features of reference images matching features of a template image (e.g., a number or percentage of matching features), ratings of reference images (e.g., user ratings), and respective locations of the reference images that are proximate to the first location (e.g., according to a distance threshold). Priority in the ranking of reference images can be based on location. For instance, reference images including location data can be given a higher priority than reference images without location data. Because metadata of the reference images can include a binary indicator that designates whether a reference image includes metadata, this determination can be quickly made and the ranking quickly and efficiently generated. Additionally or alternatively, reference images having user-entered features can be given a higher priority than reference images without user-entered features. Additionally or alternatively, reference images taken by professional photographers are given a higher priority than reference images taken by non-professional photographers (e.g., amateur photographers).

Furthermore, reference image module 144 can obtain representations of reference images. In one example, reference image module 144 generates representations of reference images. Additionally or alternatively, reference image module 144 can obtain an existing representation of a reference image, such as a representation included in metadata of a reference image. A representation of a reference image can be any suitable representation, such as a thumbnail image, animation, video, drawing, illustration, cartoon, snapshot, summary, and the like.

A reference image obtained by reference image module 144, along with any suitable information, such as rankings of reference images, locations of sources of reference images (e.g., a database or search engine from which a reference image was obtained), a search query used to obtain a reference images, rankings of reference images, parameters used to determine rankings, such as a percentage of matching features, distance between two locations, scores of reference images, and the like, used by or calculated by reference image module 144 are stored in reference image data 134 of storage 130 and made available to modules of image capture application 124. In one example, representations of reference images obtained by reference image module 144 are exposed in a user interface managed by user interface module 146.

User interface module 146 is representative of functionality configured to generate and manage any suitable user interface. User interface module 146 can include or have access to a display, such as display 126, and can cause any suitable user interface to be exposed on the display. For instance, user interface module 146 can display a user interface with any suitable image on a display, such as display 126. In one example, user interface module 146 displays at least one of a template image, a reference image, a representation of a reference image, a video stream, and a composed image.

Additionally or alternatively, user interface module 146 displays representations of interactive instructions for adjusting a position of a computing device until a composition of a video stream aligns with a composition of a reference image. For instance, user interface module 146 can expose a first indicator of the composition of the video stream and a second indicator of the composition of reference images. Indicators can be any suitable indicators, such as cross-hairs, axes, geometric shapes (e.g., circles, squares, rectangles, lines, polygons, and the like), arrows, combinations thereof, and the like.

In one example, displayed indicators are changed (e.g., updated) based on the interactive instructions. For instance, a warning message may be exposed by user interface module 146 responsive to movement in an incorrect direction (e.g., away from alignment between compositions of a video stream and a reference image). The warning message may include text, e.g., "warning, you moved the wrong way", a change of color of an indicator, e.g., a first indicator of the composition of the video stream may turn red and flash, combinations thereof, and the like. Additionally or alternatively, when the composition of the video stream matches the composition of a reference image, a displayed indicator may be modified in a user interface exposed by user interface module 146, e.g., a color of an indicator may be changed, such as to white or green, a shape may be added to an indicator, e.g., adding a circle, triangle, or square to a cross hair, and the like. In one example, when the composition of the video stream matches the composition of a reference image, a new indicator is exposed in a user interface exposed by user interface module 146. For instance, a congratulatory message may be exposed, such as "congratulations, composition alignment achieved".

In one example, user interface module 146 receives a selection of a reference image. For instance, user interface module 146 may expose a plurality of representations of reference images in a user interface, such as overlaid on top of a template image or proximate an exposed template image. A user may select one of the representations (e.g., by tapping on a touchscreen where the representation is exposed) to select the reference image indicated by the selected representation.

Additionally or alternatively, user interface module 146 can expose user options of image capture system 114, such as a selectable option (e.g., button, check box, and the like) that when enabled causes reference image module 144 to obtain reference images having representations that are exposed in a user interface by user interface module 146. For instance, user interface module 146 may expose a selection entitled "find reference images like the template image".

In one example, user interface module 146 causes a representation of instructions including directions to be exposed in a user interface. For instance, user interface module 146 may display a map (e.g., aerial map or street map) overlaid with directions, such as walking or driving directions, from a first location to a second location. A representation of directions exposed in a user interface by user interface module 146 can include any suitable data regarding the directions, such as a time to travel from a first location to a second location, a distance to travel from a first location to a second location, locations of public transportation, locations of taxis, names of buildings, names of businesses, routes to avoid (e.g., due to congested traffic, street closures, first responder activity, and the like), a compass, weather conditions, combinations thereof, and the like. Additionally or alternatively, user interface module 146 can expose in a user interface gyroscopic settings of a computing device displaying the user interface, such as numeric indicators of rotation in degrees.

In one example, a user interface generated and managed by user interface module 146 is dynamically updated as a user moves from a first location to a second location. For instance, a current position of a user may be exposed in a user interface, and changed when the user moves. Additionally or alternatively, a time remaining indicator can be exposed, indicating a time remaining to get to a location (such as a second location when the user is moving from a first location to a second location). The time remaining indicator can be updated based on a current location of the user.

A user interface generated and managed by user interface module 146, along with any suitable information, such as designators for selected reference images, directions, locations, maps, aerial photographs, indicators of composition, modifications made to indicators, alignment status, images, video streams, warning messages, and the like, used by or calculated by user interface module 146 are stored in storage 130 and made available to modules of image capture application 124.

Location module 148 is representative of functionality configured to determine whether a first location matches a second location, and when the first location does not match the second location, obtain directions from the first location to the second location. In one example, a first location is a location where a template image was captured (e.g., template image 110), and a second location is a location of a reference image (e.g., a user-selected reference image, such as a reference image of representation 112). Accordingly, location module 148 receives a location of a template image, such as from image capture module 142.

Additionally or alternatively, a first location can be a location to which a user has moved, such as responsive to receiving directions exposed in a user interface by user interface module 146, and a second location can be a location of a reference image. Accordingly, location module 148 can determine whether a user has moved to a correct location (e.g., the second location) designated by the exposed directions.

Location module 148 can determine whether a first location matches a second location in any suitable way. In one example, a distance between a first location and a second location must be less than a distance threshold to determine that the first location matches the second location. For instance, location module 148 can compare location data of a template image (e.g., GPS coordinates indicating where the template image was captured) to location data of a reference image (e.g., GPS coordinates indicating where the reference image was captured) to generate a distance between locations of the template image and the reference image. Location module 148 can compare the distance to a location threshold, such as 1 meter, to determine if the location of the template image matches the location of the reference image. If the distance is less than the location threshold, the location of the template image matches the location of the reference image. If the distance is not less than the location threshold, the location of the template image does not match the location of the reference image. In one example, responsive to location module 148 determining that two locations match, location module 148 enables video capture module 150 to capture a video stream and instructs composition instructions module 152 to generate interactive instructions to move a position of a computing device that includes video capture module 150 so that a composition of the video stream aligns with a composition of a reference image.

When location module 148 determines that a first location does not match a second location, location module 148 obtains directions from the first location to the second location. Location module 148 can obtain directions in any suitable way. In one example, location module 148 obtains directions from a map application, such as Google maps. For instance, location module 148 can provide a first location (e.g., GPS data of a first location) and a second location (e.g., GPS data of a second location) to a map application, which returns a map and directions from the first location to the second location. Additionally or alternatively, location module 148 can obtain directions by constructing a search string including an indicator of a first location (e.g., GPS coordinates of a first location) and an indicator of second location (e.g., GPS coordinates of a second location), and query a search engine using the search string to return results that include directions from the first location to the second location. For instance, for an example first location "first loc" and an example second location "second loc", which may be designated by any suitable location indicator, such as GPS coordinates, location module 148 can construct a search string "what are the best direction from first loc to second loc?" and query a search engine to obtain directions using the search string.

Directions obtained by location module 148 can be any suitable directions, such as walking directions, driving directions, train directions (e.g., subway or elevated trains), public transportation directions, and the like, and include any suitable number of routes. In one example, a route with a shortest travel time is prioritized by location module 148 and presented in a user interface exposed by user interface module 146 to reflect this prioritization, such as by displaying a shortest-distance route in bold font, prior to displaying other routes, above other routes in a listing of routes, changing a color of the route, with the shortest travel time, and the like. Additionally or alternatively, directions obtained by location module 148 can include information about locations related to the directions, such as a starting location, ending location, or location en route, including historical information, suggested restaurants, an architect or designer of a building en route or nearby, a history of the naming of a building, monument, or street, and the like.

Directions obtained by location module 148, along with any suitable information, such as an indication of whether locations match, travel time, travel distance, a preferred route, routes to avoid, and the like, used by or calculated by location module 148 are stored in location data 136 of storage 130 and made available to modules of image capture application 124. In one example, directions obtained by location module 148 are exposed in a user interface managed by user interface module 146.

Video capture module 150 is representative of functionality configured to generate a video stream. Accordingly, video capture module 150 includes or has access to a video capture device, such as a digital video camera. In one example, video capture module 150 generates a video stream (e.g., captures a video stream with a video capture device) at a location based on directions obtained by location module 148. Additionally or alternatively, video capture module 150 captures a video stream that includes a same object (e.g., a building, monument, sign, landscape, and the like) that is included in a template image captured by image capture module 142. A video stream captured by video capture module 150 can be exposed in a user interface controlled by user interface module 146.

A video stream captured by video capture module 150 can be any suitable type of video stream. In one example, a video stream captured by video capture module 150 is a "live video feed" (e.g., the video stream includes a sequence of images generated and exposed in a user interface in real time, without perceptible delay to a user). Hence, as a user moves a computing device that includes video capture module 150 while generating a video stream (e.g., capturing a live video feed), framing and composition of the video stream are changed responsive to the movement and exposed in a user interface without user-perceptible delay relative to the movement.

A video stream captured by video capture module 150 can be in any suitable type of file format, of any suitable type of aspect ratio, of any suitable resolution, and the like. In one example, a video stream captured by video capture module 150 is a high-definition resolution, such as 1720p or 1720 progressive, and in a 16×9 aspect ratio. Additionally or alternatively, a video stream captured by video capture module 150 can have a file format and resolution based on a computing device that includes video capture module 150. For instance, a resolution and aspect ratio of a video stream captured by video capture module 150 may be set by video capture module 150 automatically and without user intervention based on capabilities of a display screen on the computing device, such as display 126.

In one example, video capture module 150 extracts features from a video stream, such as features from image frames of a sequence of image frames of the video stream. Video capture module 150 can use any suitable feature extractor to extract features from a video stream, such as a rotationally-invariant feature extractor, a scale-invariant feature extractor, combinations thereof, and the like. In one example, video capture module 150 extracts features of a video stream with an ORB feature extractor. Additionally or alternatively, video capture module 150 extracts features of a video stream with a SIFT extractor.

Furthermore, video capture module 150 can normalize a video stream captured by video capture module 150. For instance, video capture module 150 may adjust settings of a video capture device to capture a video stream, such as by adjusting exposure, aperture, ISO, white balance, and the like. In one example, video capture module 150 matches settings of a video capture device of video capture module 150 to settings of a video capture device used to capture a reference image, such as a user-selected reference image. Additionally or alternatively, video capture module 150 can apply a filter to normalize a video stream, such as a brightness filter, polarization filter, color filter, and the like. In one example, video capture module 150 applies a filter to a video stream to make the video stream appear to be captured in different weather conditions than current weather conditions. For instance, video capture module 150 may obtain weather data from metadata of a reference image, including cloud types, wind and rain directions, and the like, and apply a filter to a video stream so that the video stream appears to be captured in similar weather conditions as the reference image, despite, for example, the current weather conditions for the video stream being different than the weather conditions of the reference image. In one example, video capture module 150 normalizes a video stream prior to features being extracted from the video stream.

Furthermore, gyroscopic settings of a computing device containing video capture module 150 may be determined concurrently with a video stream. For instance, video capture module 150 may record gyroscopic settings as metadata in at least some image frames of a video stream that are synchronized with the video frames, e.g., obtained at a same time.

A video stream captured by video capture module 150, along with any suitable information, such as a video stream format, resolution size, frame rate, normalization parameters, such as a filter applied when capturing a video stream or configuration settings of a video capture device used to capture a video stream, and the like, used by or calculated by video capture module 150 are stored in captured image data 132 of storage 130 and made available to modules of image capture application 124. In one example, a video stream captured by video capture module 150 is exposed in a user interface managed by user interface module 146, and provided to composition instructions module 152. Additionally or alternatively, features of a video stream extracted by video capture module 150 are provided to composition instructions module 152.

Composition instructions module 152 is representative of functionality configured to generate interactive instructions for adjusting a position of a computing device until a composition of a video stream captured by the computing device aligns with a composition of a reference image. Composition instructions module 152 can generate any suitable interactive instructions, in any suitable way.

In one example, composition instructions module 152 includes feature extraction capabilities, and can extract features from any suitable image, such as a reference image (e.g., a reference image of representation 112), a video stream generated by video capture module 150, a template image captured by image capture module 142, and the like. Accordingly, composition instructions module 152 includes or has access to any suitable feature extractor, such as a rotationally-invariant feature extractor, a scale-invariant feature extractor, combinations thereof, and the like. In one example, composition instructions module 152 extracts features of an image with an ORB feature extractor. Moreover, composition instructions module 152 can extract features of an image with a SIFT extractor. Additionally or alternatively, composition instructions module 152 can receive features that have been extracted from an image, such as features of reference images extracted by reference image module 144.

In one example, composition instructions module 152 determines a homography matrix that maps features from one image (e.g., a frame of a video stream captured by video capture module 150) to features of another image (e.g., a user-selected reference image). For instance, a homography matrix can map locations and orientations of features from one image to locations and orientations features of another image. A homography matrix can be any suitable matrix, and can represent translation and rotation of features from one image to another image. In one example, a homography matrix generated by composition instructions module 152 is a 4×4, two dimensional matrix. Composition instructions module 152 determines a homography matrix in any suitable way, such as by matching content of features from different images. In one example, a neural network is used to match content.

Additionally or alternatively, composition instructions module 152 can generate instructions for a user to re-point a computing device. For instance, composition instructions module 152 may determine that a homography matrix is poor quality, or be unable to generate an adequate homography matrix, e.g., because matching of features is poor, such as a low number of features is matched, or a confidence measure of matching feature is below a confidence threshold, such as 50% confidence that features match. Accordingly, composition instructions module 152 may generate instructions for a user to point a capture device at a scene or desired object, e.g., a same object in a template image, such as by causing a message "please point the camera at the Eiffel tower" to be exposed on a user interface of user interface module 146, and generate a new homography matrix based on the computing device being re-pointed.

Composition instructions module 152 generates an indicator of a composition of an image. For instance, composition instructions module 152 can generate a first indicator of a composition of a video stream captured by video capture module 150 and a second indicator of a composition of a reference image. Composition instructions module 152 can generate an indicator in any suitable way, such as based on a homography matrix, gyroscopic settings of a computing device, e.g., a computing device capturing a live video feed, combinations thereof, and the like. For instance, an indicator of a composition of a video stream captured by a computing device may be determined according to a horizontal setting of the computing device found from gyroscopic settings of the computing device.

Composition instructions module 152 can generate any suitable type of indicator of a composition of an image or video stream as part of interactive instructions. In one example, composition instructions module 152 generates a cross-hair indicator. Additionally or alternatively, composition instructions module 152 generates an indicator that includes perpendicular axes, geometric shapes, such as circles, squares, rectangles, triangles, polygons, and the like, solid lines, dashed lines, lines of different colors, dynamic indicators that can be updated based on alignment of compositions of images, combinations thereof, and the like.

Instructions generated by composition instructions module 152 are interactive instructions because they are updated in real time (e.g., without perceptible delay to a user) as a user moves a computing device. For instance, a user may move a position of a computing device capturing a live video stream, and composition instructions module 152 updates indicators included in interactive instructions exposed in a user interface as the user moves the computing device. Hence, interactive instructions generated by composition instructions module 152 guide a user to position a computing device to achieve a target orientation corresponding to a desired composition, such as a composition matching a composition of a selected reference image.

In one example, instructions generated by composition instructions module 152 include configuration settings, such as aperture, shutter speed, ISO, white balance, filters, zoom level, and the like to apply to an image capture device. For instance, once a desired orientation and position of a computing device are obtained by aligning indicators of composition for a video feed generated by video capture module 150 and a reference image obtained by reference image module 144, composition instructions module 152 may provide configuration settings as part of instructions exposed in a user interface of user interface module 146. A user can then configure a capture device of image capture module 142 according to the instructions exposed in a user interface to capture a composed image. In one example, composition instructions module 152 determines that a composition for a video feed generated by video capture module 150 matches a composition of a reference image obtained by reference image module 144, e.g., a user has correctly aligned indicators generated by composition instructions module 152 in a user interface exposed by user interface module 146, and automatically and without user intervention configures a capture device of image capture module 142 according to configuration settings, such as settings of a selected reference image. Accordingly, composition instructions module 152 can automatically and without user intervention configure a capture device of image capture module 142 to capture a composed image responsive to a user moving a position of the computing device that corresponds to a matching composition of a reference image.

Instructions generated by composition instructions module 152, along with any suitable information, such as image features, a homography matrix, gyroscopic data, configuration settings, GPS coordinates of a computing device once alignment of compositions of images is achieved, a number of attempts a user made to align compositions of images (e.g., a number of times a user had to re-point a camera), a length of time a user took to achieve alignment of compositions of images, and the like, used by or calculated by composition instructions module 152 are stored in composition instruction data 138 of storage 130 and made available to modules of image capture application 124. In one example, instructions generated by composition instructions module 152 are exposed in a user interface of user interface module 146.

Having considered an example digital medium environment, consider now a discussion of example user interfaces containing example images in accordance with instructing image composition when an image is captured.

Example User Interfaces and Example Images

FIG. 2-FIG. 6 illustrate example user interfaces and example images for an example use case in which a user desires to take a composed image of a building (e.g., an office building). Accordingly, these figures illustrate user interfaces for providing instructions for image composition when an image is captured based on a reference image location, and can be exposed on a computing device at any suitable time, such as when a user is at a location corresponding to where a template image is captured, where a reference image was captured, where a video stream is captured, where a composed image is captured, combinations thereof, and the like. Additionally or alternatively, elements of user interfaces of FIG. 2-FIG. 6 can be combined in any suitable way. For instance, an aspect of one user interface may be included in another user interface.

Figure 2:
FIG. 2 illustrates an example user interface including an example template image in accordance with one or more aspects of the disclosure.

FIG. 2 illustrates an example user interface 200 including an example template image in accordance with one or more aspects of the disclosure. User interface 200 is an example of a user interface generated and managed by user interface module 146. User interface 200 exposes template image 202. Template image 202 is an example of a template image captured by image capture module 142, such as template image 110 in FIG. 1.

User interface 200 also includes controls 204. Controls 204 can include any suitable controls, such as controls, adjusters, settings, buttons, sliders, tabs, menus, and the like for display of user interface 200 (e.g., zoom level, brightness, contrast, color, and the like), controls for image capture system 114, including controls for image capture application 124, (e.g., user preferences for display of reference images, options for indicators generated by composition instructions module 152, selections to enable a search for reference images, control and display of metadata, control to enable image capture system 114, combinations thereof, and the like.

In the example in FIG. 2, a user captures template image 202, but may not be happy with the composition or aesthetic appeal of template image 202. Accordingly, a user may select a control option in controls 204 to enable image capture system 114 (see FIG. 1). Responsive to a user selection of a control option in controls 204 to enable image capture system 114, image capture system 114 may determine a location of a computing device that captured template image 202. Additionally or alternatively, responsive to a user selection of a control option in controls 204 to enable image capture system 114, image capture system 114 may obtain reference images and expose representations of reference images in user interface 200, such as overlapping template image 202, proximate template image 202 (e.g., in a sidebar or data panel), and the like. In one example, image capture system 114 determines a location of a computing device that captured template image 202 and obtains reference images automatically and without user intervention, such as responsive to template image 202 being captured, the computing device being at a certain location, such as within an area threshold of a location of interest, such as a location corresponding to a known reference image (e.g., when the computing device is within 100 feet of a location of a historic monument for which a reference image can be obtained), combinations thereof, and the like.

Figure 3:
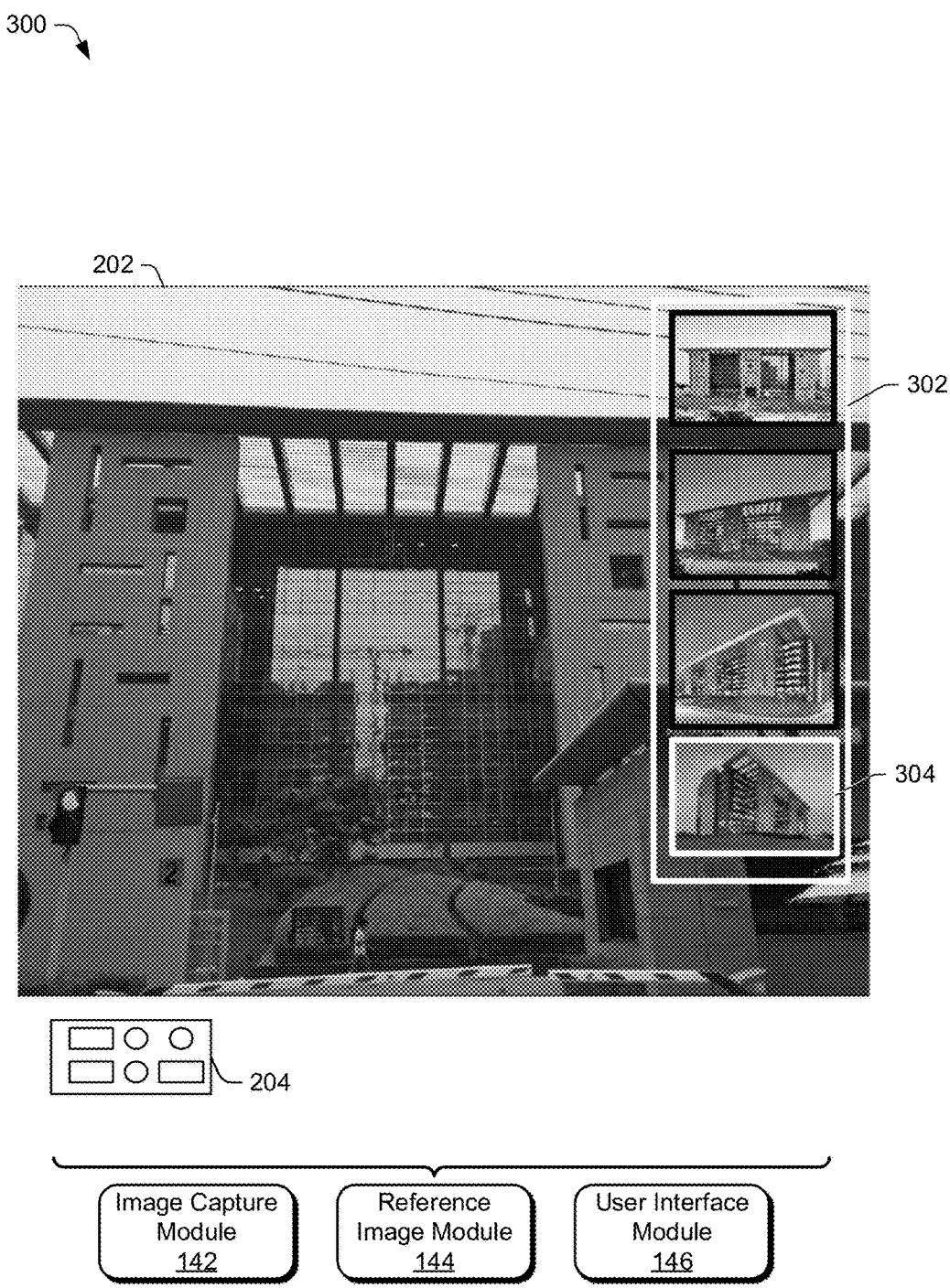
FIG. 3 illustrates an example user interface including example representations of reference images in accordance with one or more aspects of the disclosure.

FIG. 3 illustrates an example user interface 300 including example representations of reference images in accordance with one or more aspects of the disclosure. User interface 300 includes template image 202 and controls 204 as illustrated in FIG. 2, but also exposes representation panel 302, shown in FIG. 3 with a white rectangle. Representation panel 302 includes representations of reference images. In the example in FIG. 3, representation panel 302 includes four thumbnail images that each show a different image of the building included in template image 202. For instance, the building is an object of interest in template image 202, and the representations of representation panel 302 illustrate photographs of the building from different perspectives (e.g., angles).

Reference images of thumbnail representations represented in representation panel 302 may be determined based on features extracted from template image 202, as described above. Any suitable feature of the building in template image 202 can be extracted and matched to features of reference images, such as a geometry of the building, a pattern of windows of the building, a relation of glass to other material, such as concrete or wood, landscaping, and the like.

A user selection of one of the representations of reference images is received. In the example in FIG. 3, a user selection of the bottom thumbnail image of the four thumbnail images in representation panel 302 is received at representation 304. Accordingly, a border of representation 304 can be changed responsive to the user selection. For instance, the border of representation 304 has been changed from black to white based on representation 304 being selected by a user.

A user can select a representation of a reference image in representation panel 302 in any suitable way. In one example, a user touches a touch screen coincident with a representation to select that representation. Additionally or alternatively, a user selection can be received with a mouse click, keyboard stroke (e.g., enter key), selection in a pull down menu, natural gesture (e.g., pointing to a representation or focusing a user's eyes on one of the representations), combinations thereof, and the like. In one example, each of the representations displayed in representation panel 302 can be selected by a keyboard shortcut (e.g., keystroke or combination of keystrokes) unique to a representation in representation panel 302. For instance, a user may highlight representation panel 302, such as by clicking on a border of representation panel 302, moving a cursor over representation panel 302, and the like, and then enter a "1" to select a first (e.g., top) displayed representation, a "2" to select a second (e.g., second from the top) displayed representation, a "3" to select a third (e.g., third from the top) displayed representation, and the like.

In one example, responsive to a user selection of a representation in representation panel 302, user interface 300 may expose a reference image of a selected representation, such as overlaid on top of template image 202 (not shown). Additionally or alternatively, template image 202 may be removed from user interface 300 and replaced with a reference image of a selected representation in representation panel 302.

Additionally or alternatively, user interface 300 may expose any suitable message responsive to a user selection of a representation in representation panel 302. For instance, user interface 300 may expose a message "would you like to capture an image like the selected image?". In one example, controls 204 includes a selectable option to get directions to a location where a reference image of a selected representation in representation panel 302 was taken. For instance, a user may enable a "get directions" button which causes direction, such as a map with a highlighted route, to be exposed in user interface 300.

Figure 4:
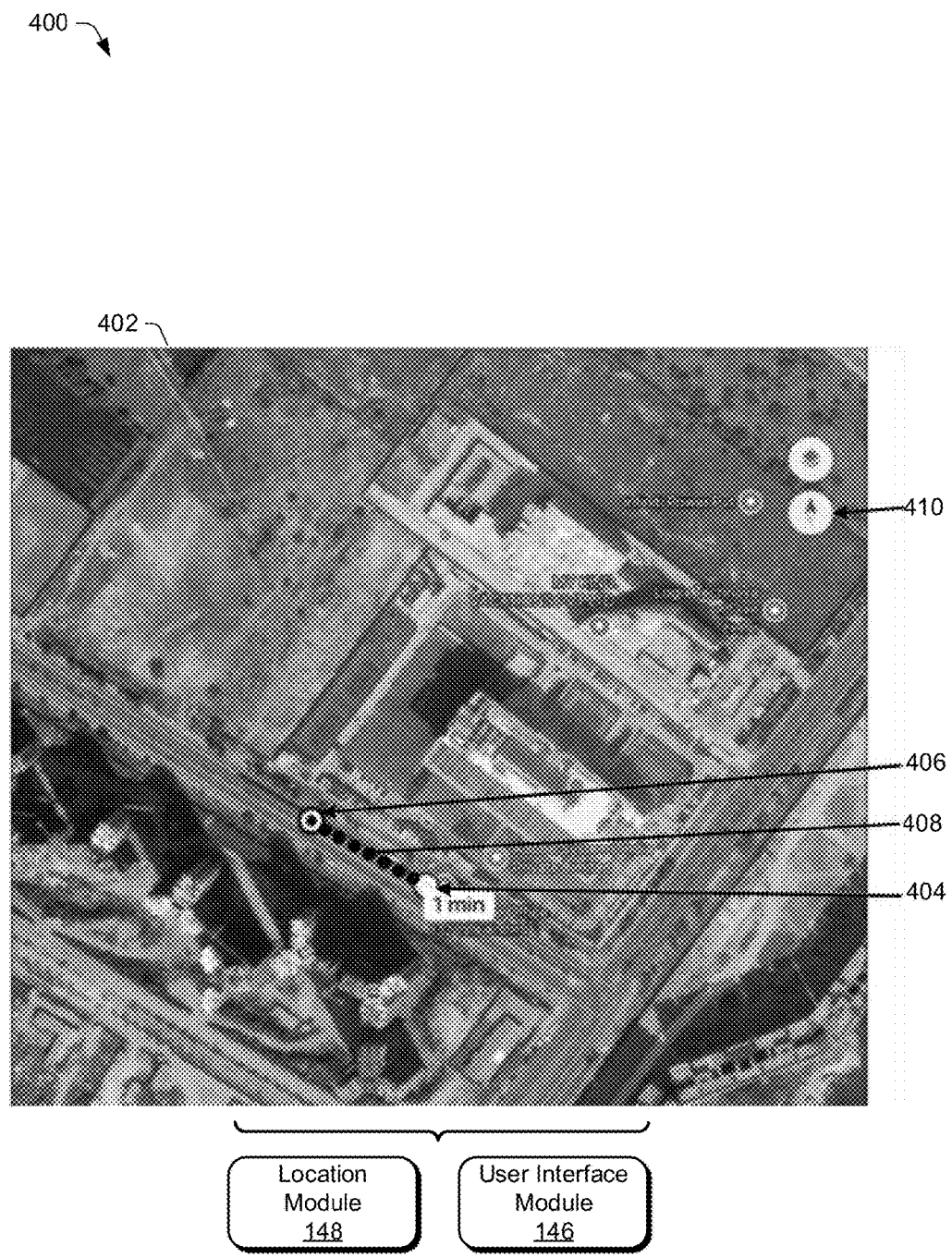
FIG. 4 illustrates an example user interface including example directions in accordance with one or more aspects of the disclosure.

For instance, FIG. 4 illustrates an example user interface 400 including example directions in accordance with one or more aspects of the disclosure. User interface 400 exposes a map 402 that displays a route from a first location 404 to a second location 406. For instance, first location 404 corresponds to a location where template image 202 was captured (see FIG. 2 and FIG. 3), and second location 406 corresponds to a location where a reference image of representation 304 (e.g., the user-selected reference image in FIG. 3) was captured.

In the example in FIG. 4, map 402 includes an aerial photograph (e.g., captured with an aircraft or spacecraft). Map 402 includes a street route 408 (indicated by a series of circles) from first location 404 to second location 406. Moreover, map 402 illustrates in a text bubble at first location a travel time (e.g., "1 min") from first location 404 to second location 406. In addition, map 402 includes a compass 410, designating an arrow pointing North, as well as the names of numerous buildings and business.

Figure 5:
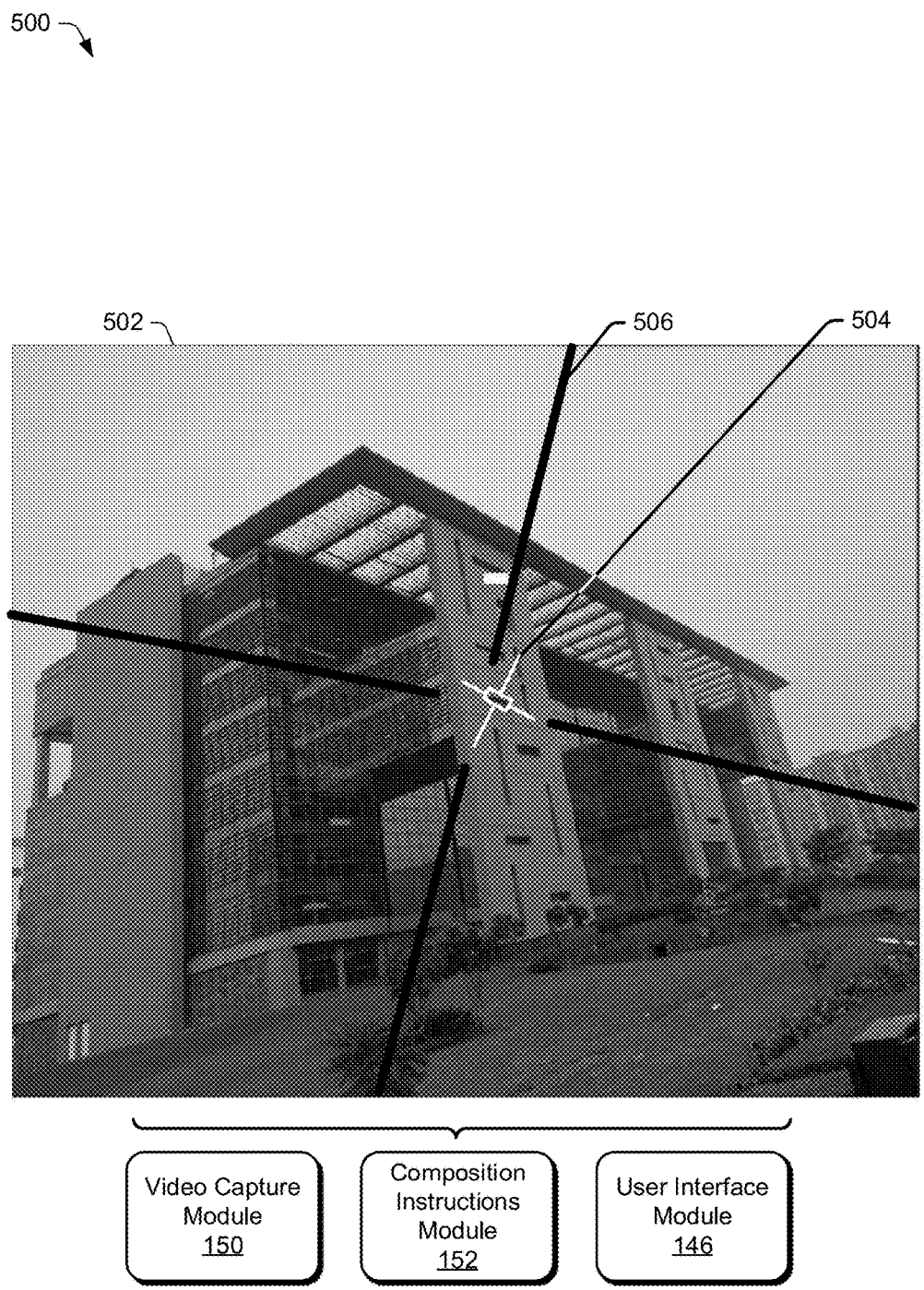
FIG. 5 illustrates an example user interface including an example video stream in accordance with one or more aspects of the disclosure.

FIG. 5 illustrates an example user interface 500 including an example video stream in accordance with one or more aspects of the disclosure. User interface 500 includes image frame 502 (e.g., one image from of a sequence of image frames included in a video stream captured by a video capture device, such as included in video capture module 150 in FIG. 1).

In the example in FIG. 5, a user has moved from first location 404 to second location 406 (see FIG. 4) and pointed a video capture device at the building included in template image 202 (see FIG. 2 and FIG. 3). Since the user has moved to second location 406, the composition of image frame 502 is close to the composition of the desired reference image (e.g., the reference image of representation 304 selected in FIG. 3). However, the composition of image frame 502, though close, does not match the composition of the desired reference image. For instance, user interface 500 exposes first indicator 504 and second indicator 506 that are not aligned with each other.

First indicator 504 and second indicator 506 are examples of indicators generated by composition instructions module 152 as part of interactive instructions to adjust a position of a computing device (e.g., a computing device containing a video capture device that is capturing a live video stream that includes image frame 502). First indicator 504 indicates a composition of the video stream that includes image frame 502, and second indicator 506 indicates a composition of a reference image of representation 304 selected in FIG. 3.

First indicator 504 and second indicator 506 are updated in real time and exposed in user interface 500. A user moves the computing device to align first indicator 504 and second 506. For instance, second indicator 506 is a target indicator to which first indicator 504 is to be aligned by moving a position of the computing device until first indicator 504 is within the center of second indicator 506 (e.g., within the center of the four black lines indicated by second indicator 506). In other words, a position of the computing device is moved until the cross-hairs of first indicator 504 align with the cross hairs of indicator 506. Because first indicator 504 and second indicator 506 are updated in real time, first indicator 504 and second indicator 506 guide a user to move a computing device to a specific position and orientation that corresponds to the composition of a reference image.

In one example, a shape, size, angle, or combination thereof of first indicator 504, second indicator 506, or first indicator 504 and second indicator 506 is changed to indicate a direction to move the computing device. For instance, one or more of the four cross hairs included in first indicator 504 can be lengthened or shortened to indicate that the computing device needs to be rotated. As an example, if one cross hair of first indicator 504 is shorter than an opposing cross hair of first indicator 504, the device may need to be tilted towards (or away from) the shorter cross hair to achieve the desired composition. When at a desired tilt angle, opposing cross hairs of first indicator 504 can be adjusted to be equal length.

Figure 6:
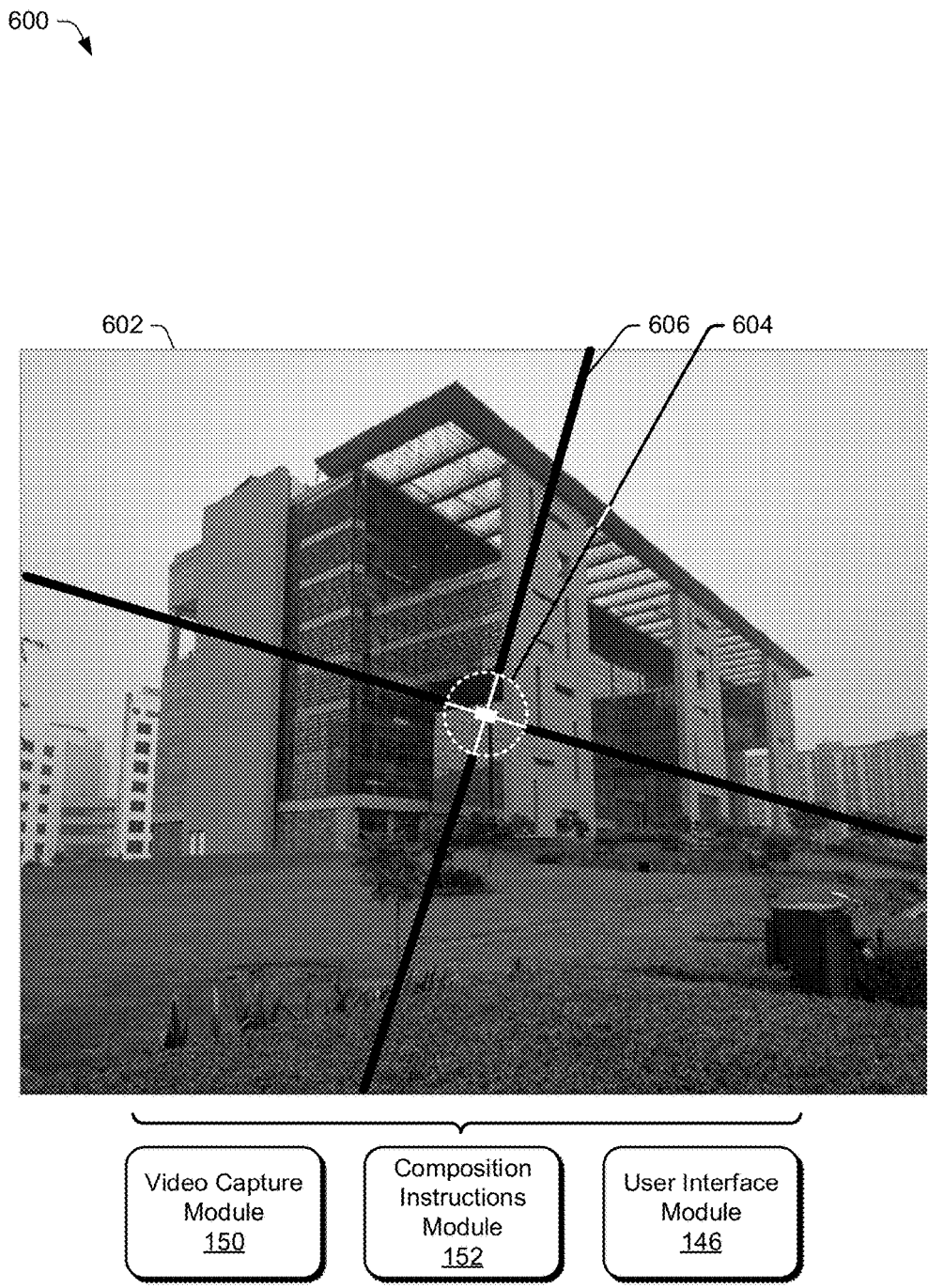
FIG. 6 illustrates an example user interface including an example composed image in accordance with one or more aspects of the disclosure.

FIG. 6 illustrates an example user interface 600 including an example composed image 602 in accordance with one or more aspects of the disclosure. User interface 600 also includes first indicator 604 and second indicator 606. First indicator 604 and second indicator 606 are examples of first indicator 504 and second indicator 506 in FIG. 5, respectively, when the indicators are aligned and a composition of image frame 502 matches a composition of the reference image of representation 304 selected in FIG. 3. For instance, a user has successfully moved a position of a computing device under the guidance of interactive instructions generated by composition instructions module 152.

In FIG. 6, because first indicator 604 is aligned with second indicator 606, first indicator 604 has been modified with respect to first indicator 504 in FIG. 5. For instance, the center rectangle has been filled in, and a dashed circle has been added to first indicator 604. An indicator, e.g., first indicator 604 relative to first indicator 504, second indicator 606 relative to second indicator 506, or combinations thereof, can be modified in any suitable way to indicate alignment. In one example, a color of an indicator is changed to indicate alignment. Additionally or alternatively, an indicator may flash (e.g., blink) when alignment of compositions is within an alignment threshold, e.g., when a first indicator is within a specified region of a second indicator, such as within a pre-determined distance to a center of a second indicator.

Furthermore, because first indicator 604 is aligned with second indicator 606 in FIG. 6, a user has positioned a computing device to a specific position and orientation that corresponds to the composition of the reference image of representation 304 selected in FIG. 3. Accordingly, composed image 602 has a same composition as the composition of the reference image of representation 304 selected in FIG. 3.

Having considered example user interfaces and example images, consider now a discussion of an example system usable for instructing image composition when an image is captured based on reference image location.

Example Image Capture System

Figure 7:
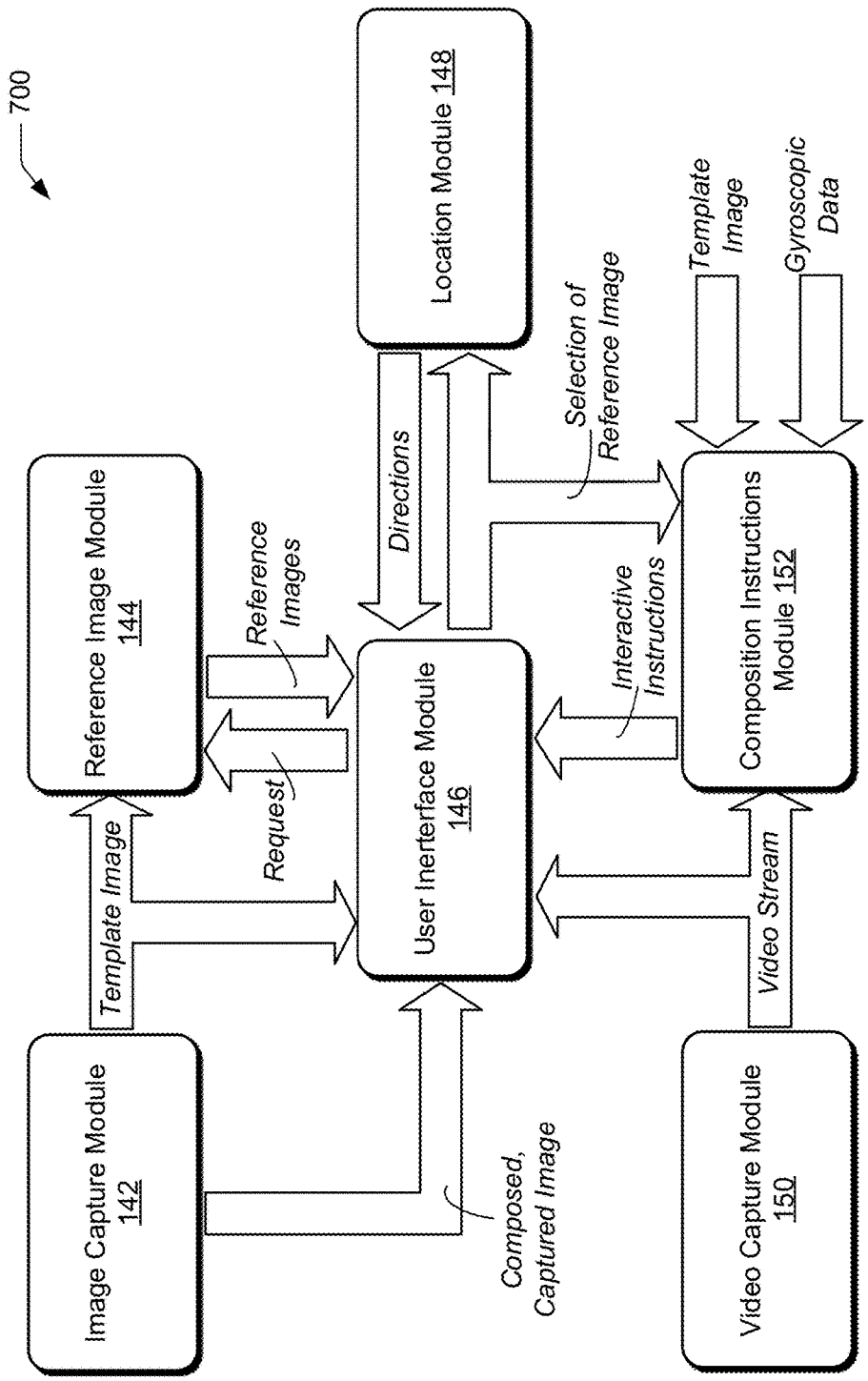
FIG. 7 illustrates an example system usable to provide instruction for image composition when an image is captured based on a reference image location in accordance with one or more aspects of the disclosure.

FIG. 7 illustrates an example system 700 usable to provide instruction for image composition when an image is captured based on a reference image location in accordance with one or more aspects of the disclosure. In this implementation, system 700 includes the modules of image capture application 124 as described in FIG. 1, e.g., image capture module 142, reference image module 144, user interface module 146, location module 148, video capture module 150, and composition instructions module 152. System 700 is one example of image capture system 114 that can be constructed using the modules of image capture application 124. For instance, signals can be redefined, and modules can be modified, combined, divided, added, or removed to form a modified system, without altering the functionality of system 700. Accordingly, such modified systems are considered to be within the scope of the disclosure.

Furthermore, for simplicity system 700 is limited to the modules of image capture application 124 and a description of some of their interconnects. System 700 can, however, include any suitable signals and communications between modules omitted for simplicity. Such signals may include system clocks, counters, image indicators, image frame indicators, feature indicators, reset signals, and the like. In one example, system 700 can operate in real time (e.g., with no perceptible delay to a user) to expose a template image, representations of reference images, a video stream, interactive instructions, a composed image, combinations thereof, and the like. Accordingly, signals can be calculated by the modules of system 700 and communicated between the modules of system 700 without significant delay. For instance, system 700 can preemptively obtain reference images based on a template image or a location of a computing device including system 700 (e.g., a location where a template image is captured, a location that is determined to be proximate a location of a reference image, and the like), so that reference images matching content of a template image can be exposed in a user interface without delay of obtaining the reference images.

Moreover, system 700 can be implemented on any suitable device or devices. In one example, system 700 is implemented on one computing device (e.g., one of computing devices 106 in FIG. 1). In another example, system 700 is implemented on more than one computing device. For instance, parts of system 700 can be implemented by a first computing device, such as computing device 106-1 in FIG. 1, and other parts of system 700 can be implemented by an additional computing device or devices, such as computing device 106-2. In one example, a server implements parts of system 700, such as server 120 in FIG. 1. A server can be remote, e.g., because it is not collocated with the first computing device. A server may be configured to receive signals of system 700 from a computing device (e.g., one or more of computing devices 106), process the received signals, such as with image capture support system 122, and transmit results of the processing back to the computing device. Hence, image capture support system 122 of server 120 in FIG. 1 may include system 700.

Additionally or alternatively, parts of system 700 can be implemented by an additional computing device that is collocated with a first computing device. For instance, one of computing devices 106 may be a first computing device, and another of computing devices 106 may be an additional, collocated computing device. The first computing device and the additional computing device may be operated by one or more users. Hence, system 700 provides for multiple users within an environment to share data included in system 700. For instance, a template image may be captured by a first computing device operated by a first user, and sent to another computing device operated by a second user. The second user can then select a reference image that matches the template image, and send the selection of the reference image back to the first user and the first computing device. The first user of the first computing device can then obtain directions to a location of the reference image selected by the second user, capture a composed image, and share the composed image with other users, such as the second user.

Image capture module 142 captures a template image that includes an object of interest, such as a building, monument, landscape (e.g., Mt. Rainier), and the like. Image capture modules captures the template image at a first location. In one example, image capture module 142 extracts features of content from a template image. For instance, image capture module 142 may extract content features from a template image automatically and without user intervention responsive to the template image being captured.

Image capture module 142 provides the template image to reference image module 144 and user interface module 146. In one example, a template image provided to reference image module 144 and user interface module 146 from image capture module 142 includes content features of the template image, such as included in metadata of the template image (e.g., in a file header of the template image).

User interface module 146 exposes a template image received from image capture module 142 in a user interface. In one example, user interface module 146 exposes a prompt inquiring if a user would like to see other images having a same object as the template image (e.g., a same building, stature, mountain, etc. included in a template image). When a user affirms the prompt, user interface module 146 may communicate a request to reference image module 144 to obtain reference images.

Reference image module 144 obtains reference images, e.g., images having matching content as a template image, images having a location close to a location where a template image was captured, combinations thereof, and the like. In one example, reference image module 144 obtains reference images responsive to a user request to obtain reference images received in a user interface of user interface module 146. Additionally or alternatively, reference image module 144 can obtain reference images automatically and with user intervention, e.g., without an explicit request to obtain reference images. For instance, reference image module 144 can obtain reference image responsive to a template image being captured or a location of a capture device being proximate a location associated with reference images.

Reference image module 144 obtains reference images in any suitable way, such as by accessing a database of images, conducting a search with a search engine for reference images, combinations thereof, and the like. In one example, reference image module 144 extracts features of images, such as content features of a template image, images obtained from a database, or images received in search results. Reference image module 144 may rank reference images, such as based on content features (e.g., features matching features of a template image), a location (e.g., a location included in metadata in a reference image), user-ratings of reference images, an indicator of whether a reference image was captured by a professional photographer, combinations thereof, and the like. Additionally or alternatively, reference image module 144 can generate representations of reference images, such as thumbnail images.

Reference image module 144 provides representations of reference images to user interface module 146. In one example, reference image module 144 provides representations of reference images including a ranked order of the representations, such as an order to display the representations based on a ranking of reference images generated by reference image module 144. Hence, reference image module 144 may communicate instructions to user interface module 146 for exposing representations in a user interface, such as in a particular order, in a particular format (e.g., highlight or bold some representations, but not others), a size of representations (e.g., expose higher-ranked representations larger that lower-ranked representations), and the like.

User interface module 146 exposes representations of reference images received from reference image module 144 in a user interface. User interface module 146 then receives a user selection of one of the exposed representations, indicating a user selection of a reference image corresponding to the selected representation. For instance, the user selection indicates that a user would like to compose an image like the reference image of the selected representation. User interface module 146 provides the user selection, e.g., the selected reference image or any suitable indication of the selected reference image, to location module 148.

Location module 148 receives a user selection of a reference image from user interface module 146 and determines whether a first location of the template image matches a second location of the selected reference image. For instance, the first location of the template image may be obtained from the computing device that captured the template image, or metadata of the template image, and the second location may be obtained from metadata of the selected reference image. When the first location does not match the second location, location module 148 obtains directions from the first location to the second location.

Location module 148 provides directions from a first location to a second location to user interface module 146, which exposes the directions in a user interface. Directions obtained by location module 148 and exposed in a user interface may include any number of routes of various types, such as walking, driving, train, boat (e.g., ferry), taxi, and the like. Hence, a user may select one of the routes exposed by user interface module 146, which may then update a display of directions received from location module 148 (e.g., user interface module 146 may remove the display of routes not selected by a user).

Furthermore, as a user moves from a first location to a second location, user interface module 146 and location module 148 may communicate with each other to update directions and a user interface exposed by user interface module 146. For instance, a current position of a user as the user moves may be exposed in a user interface of user interface module 146. Additionally or alternatively, user interface module 146 may update a time remaining for a user to arrive at a second location. A time-remaining variable can be updated based on a current position of a user, obtained by location module 148.

When a user arrives at a second location indicated by directions from location module 148, video capture module 150 is enabled to capture a live video stream. In one example, video capture module 150 is enabled to capture a live video stream automatically and without user intervention, responsive to video capture module 150 being within a location threshold (e.g., 3 meters) of a second location (e.g., a location of a selected reference image). In another example, video capture module 150 is enabled to capture a live video stream responsive to a user selection (e.g., a user selection of an option in controls 204 in FIG. 2 and FIG. 3).

Video capture module 150 provides a video stream (e.g., a live video stream including a sequence of image frames captured by video capture module 150 at a frame rate, such as 24 or 30 frames per second) to user interface module 146 and composition instructions module 152. Video capture module 150 exposes a video stream captured by video capture module 150 in a user interface, together with interactive instructions generated by composition instructions module 152.

Composition instructions module 152 generates interactive instructions to guide a user to position a computing device so that a composition of the video stream matches (e.g., aligns with) a composition of a selected reference image. Composition instructions module 152 receives any suitable data to generate interactive instructions. In system 700 of FIG. 7, composition instructions module 152 receives a template image captured by image capture module 142, gyroscopic settings (e.g., indicators of rotational motion, including any suitable number and type of angular measurement with respect to any suitable axis, such as angular velocities about each of three perpendicular axes), and a selected reference image. First indicator 504 and second indicator 506 in FIG. 5, and first indicator 604 and second indicator 606 in FIG. 6 are examples of interactive instructions generated by composition instructions module 152.

When a user moves a computing device to align a composition of a video stream generated by video capture module 150 with a composition of a selected reference image, composition instructions module 152 communicates an alignment signal to indicate alignment as part of interactive instructions to user interface module 146. User interface module 146 indicates alignment between compositions of images according to the alignment signal, such as by exposing a message in a user interface, such as "congratulations, successful alignment achieved", changing an indicator (e.g., a color or shape of an indicator), combinations thereof, and the like.

Furthermore, composition instructions module 152 communicates configuration settings, such as aperture, ISO, shutter speed, zoon level, filters, and white balance, of a selected reference image to image capture module. In one example, composition instructions module 152 includes configurations settings in interactive instructions that are provided to user interface module 146, and user interface module 146 exposes the configuration settings in a user interface. Hence, a user may see the configuration settings in a user interface and manually configure image capture module 142 based on the configuration settings to capture a composed image. Additionally or alternatively, composition instructions module 152 can communicate configuration settings directly to image capture module 142 and automatically configure image capture module 142 based on the configurations settings to capture a composed image.

Image capture module 142 captures a composed image. A composed image includes a same object included in a template image captured by image capture module 142. A composed image captured by image capture module 142 can be captured at a second location, and a template image captured by image capture module 142 can be captured at a first location. In one example, the second location is a different location than the first location. In another example, the second location and the first location are a same location.

System 700 constitutes an improvement over systems that post-process images and do not provide instructions for composing an image at the time of image capture. System 700 enables a user to capture a composed image having a same composition as a reference image at the time of image capture. For instance, a user can capture a composed image at a same location and with a camera in a same position and orientation, and configured with same configurations settings as a camera used to capture the reference image. Accordingly, not only does system 700 enable a user to take a composed image having a desired composition, system 700 teaches a user in an interactive way (e.g., with interactive instructions to position a camera, with directions to proper locations from which to take an image, and with camera configuration settings) how to capture a well-composed image with subject matter selected by the user. Accordingly, system 700 provides valuable photographic education without the expense in time and money of photography classes.

Having considered an example system 700, consider now a discussion of example procedures for instructing image composition when an image is captured based on reference image locations in accordance with one or more aspects of the disclosure.

Example Procedures

Figure 8:
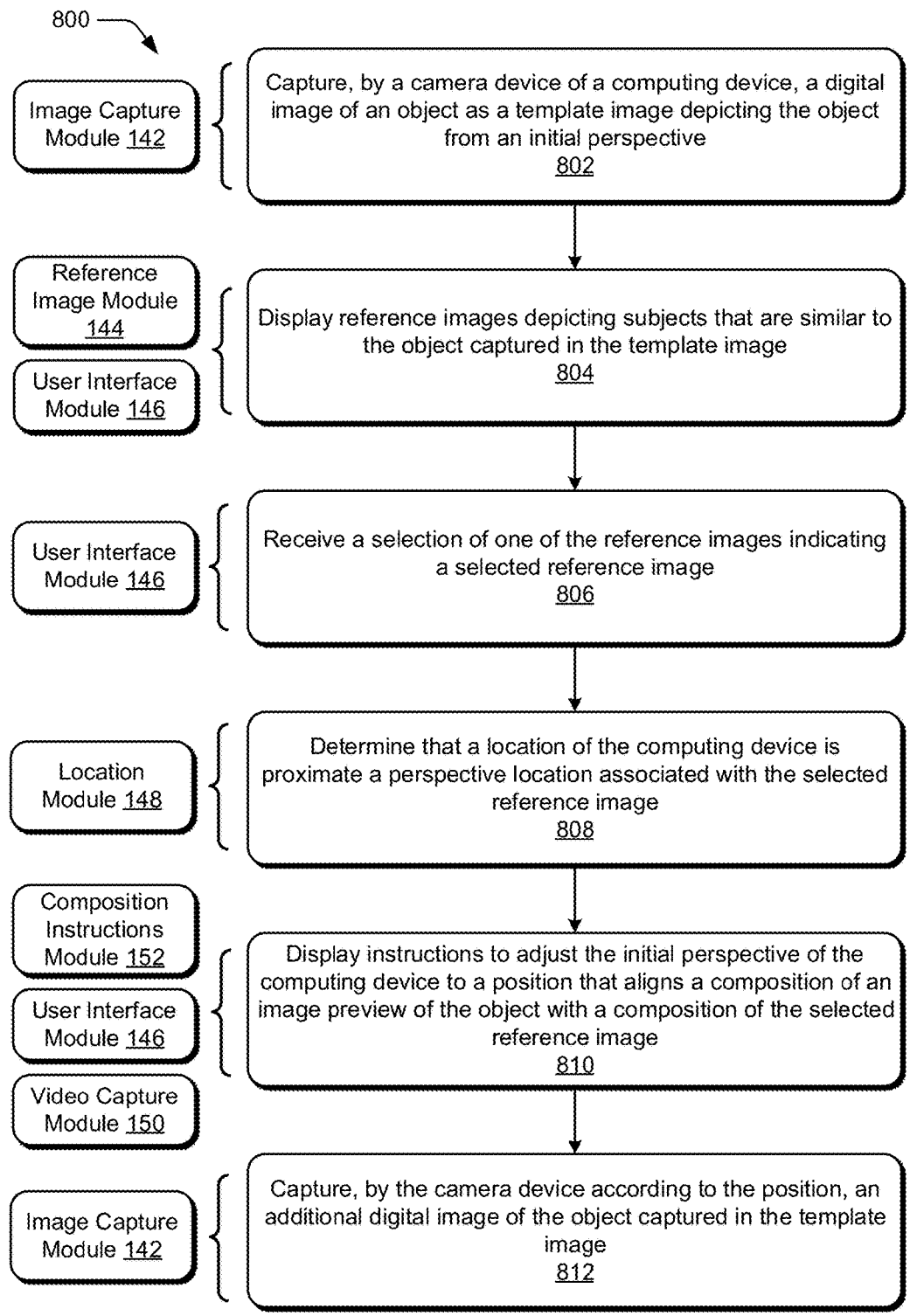
FIG. 8 illustrates a flow diagram depicting an example procedure in accordance with one or more aspects of the disclosure.

FIG. 8 illustrates an example procedure 800 for providing image composition instruction based on reference image perspective, including instructing image composition when an image is captured based on reference image locations, in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 106 or server 120 of FIG. 1 that makes use of an image capture system, such as system 700 or image capture system 114. An image capture system implementing procedure 800 may be an independent application that has been installed on the computing device, a service hosted by a service provider that is accessible by the computing device, a plug-in module to the computing device, or combinations thereof.

A digital image is captured of an object as a template image depicting the object from an initial perspective (block 802). In one example, image capture module 142 captures the digital image, such as by capturing a template image with an image capture device (e.g., a digital camera or digital video camera).

Reference images depicting subjects that are similar to the object captured in the template image are displayed. In one example, reference image module 144 determines that reference images match a template image (e.g., the reference images depict subjects that are similar to or the same as the object captured in the template image), and generates representations of reference images exposed in a user interface of user interface module 146. Additionally or alternatively, reference images can be determined based at least in part on respective locations of the reference images corresponding to where the reference images were taken.

In one example, reference images that are displayed are determined based on determining that the subjects depicted in the reference images are a same object as the object captured in the template image. Additionally or alternatively, reference images that are displayed are determined based at least in part on respective ratings of the reference images, wherein the respective ratings indicate a relative amount of approval of the reference images, such as a number of likes or dislikes of an image.

A selection of one of the reference images is received (block 806). In one example, user interface module 146 receives a selection of one of the reference images. The selection of one of the references indicates a selected reference image. For instance, a user may select a representation of a reference image exposed in a user interface of user interface module 146 and thereby indicate a selected reference image.

It is determined that a location of a computing device is proximate a perspective location associated with the selected reference image (block 808). In one example, location module 148 determines that a location of a computing device is proximate a perspective location associated with the selected reference image. Additionally or alternatively, a template image can be captured when the location of the computing device is proximate the perspective associated with the selected reference image.

In one example, features (e.g., content features) are extracted from a template image, and additional features (e.g., content features) are extracted from reference images. Reference images can be determined based at least in part on matching the features from the template image to the additional features from the reference images. Additionally or alternatively, reference images are determined based at least in part on respective ratings of the reference images. Additionally or alternatively, reference images are determined based at least in part on respective locations of the reference images (e.g., locations indicating where the reference images were captured).

Instructions are displayed to adjust the initial perspective of the computing device to a position that aligns a composition of an image preview of the object with a composition of the selected reference image (block 810). In one example, composition instructions module 152 obtains instructions to adjust a perspective of the computing device to a position that aligns a composition of an image preview with a composition of the selected the reference image. An image preview can be any suitable image preview. In one example, video capture module 150 generates a video stream, and an image preview is determined from the video stream, such as from one or more frames of the video stream. A video stream can be a live video feed generated in real time (e.g., without perceptible delay to a user).

In one example, instructions are displayed to adjust a position of the computing device by displaying a first indicator of the composition of the video stream and a second indicator of the composition of the selected reference images. Additionally or alternatively, displaying can include changing one of the first indicator and the second indicator when the composition of the video stream matches the composition of a selected reference image.

Furthermore, the instructions can be interactive and received until the composition of the video stream matches the composition of the selected reference image determined by aligning first the indicator with the second indicator.

Additionally or alternatively, first features can be extracted from the video stream, and second features can be extracted from the selected reference image. A homography matrix to map respective ones of the first features from the video stream to the second features from the selected reference image can be determined. The second indicator can be displayed based on the homography matrix. Additionally or alternatively, gyroscopic settings of the computing device are determined, and the first indicator can be displayed based on the gyroscopic settings.

An additional digital image of the object captured in the template image is captured (block 812). The additional digital image is captured by the camera device according to a position that aligns a composition of an image preview of the object with a composition of the selected reference image. The additional image can be a composed image, such as composed image 116 in FIG. 1. In on example, an image preview of the object includes a video stream of the object.

Additionally or alternatively, settings of a capture device used to capture the one of the reference images can be received, and the additional image can be captured by the camera device when the camera device is configured based on the settings of the capture device, such as to match the settings of the capture device.

In one example, it is determined that the location of the computing device does not match the perspective location associated with the selected reference image. Displaying instructions can include displaying include directions from the location of the computing device to the perspective location associated with the selected reference image. Additionally or alternatively, at least one of the location of the computing device and the perspective location associated with the selected reference image can be represented by GPS data.

In one example, directions include an estimate of time to travel from the location of the computing device to the perspective location associated with the selected reference image. Additionally or alternatively, the directions can include a map from the location of the computing device to the perspective location associated with the selected reference image.

Figure 9:
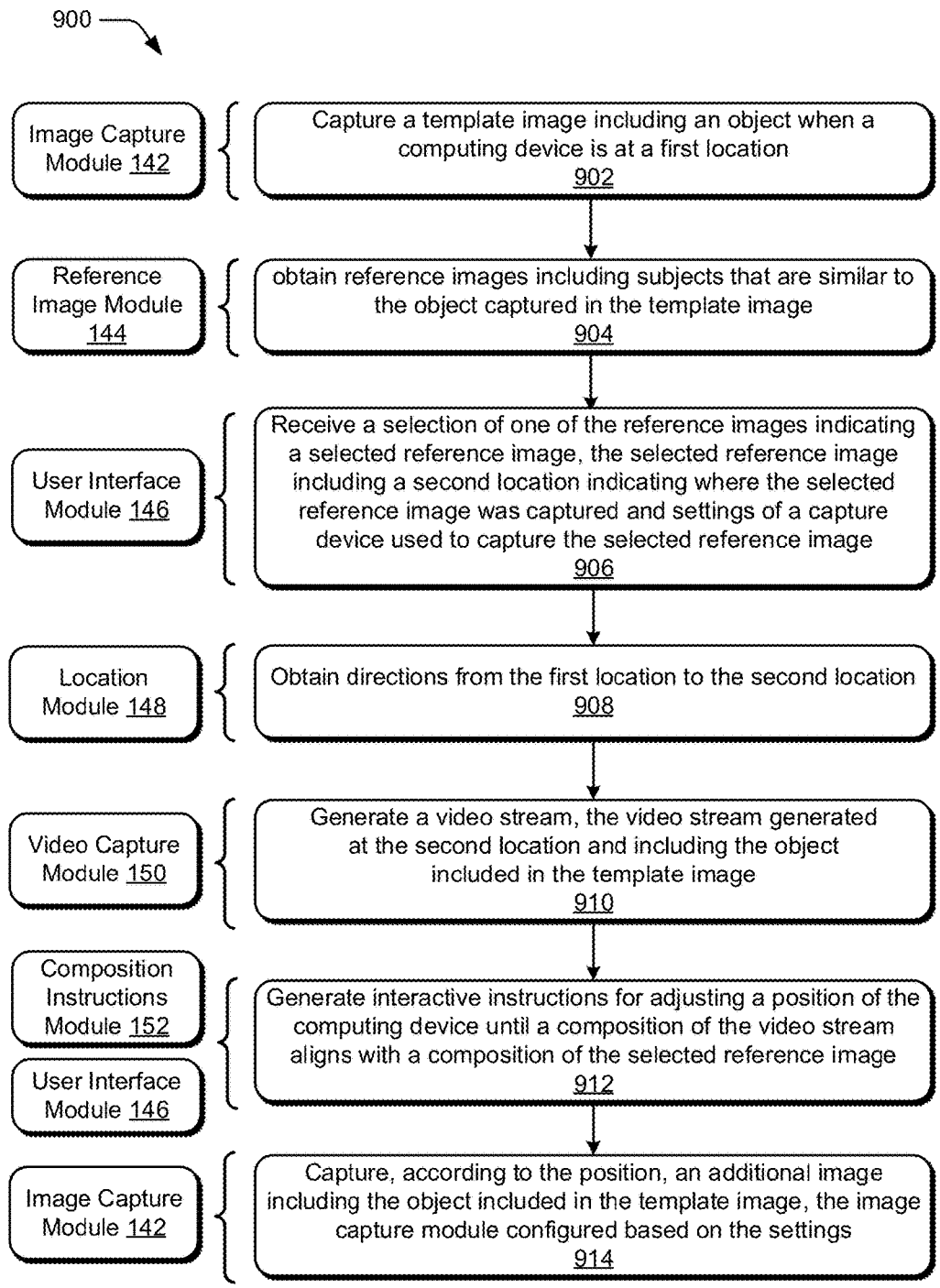
FIG. 9 illustrates a flow diagram depicting an example procedure in accordance with one or more aspects of the disclosure.

FIG. 9 illustrates an example procedure 900 for providing image composition instruction based on reference image perspective, including instructing image composition when an image is captured based on reference image locations, in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 106 or server 120 of FIG. 1 that makes use of an image capture system, such as system 700 or image capture system 114. An image capture system implementing procedure 900 may be an independent application that has been installed on the computing device, a service hosted by a service provider that is accessible by the computing device, a plug-in module to the computing device, or combinations thereof.

A template image is captured including an object when a computing device is at a first location (block 902). In one example, image capture module 142 captures a template image including an object when a computing device is at a first location.

Reference images including subjects that are similar to the object captured in the template image are obtained (block 904). In one example, reference image module 144 obtains reference images matching the template image by determining reference images that include subjects that are similar to the object captured in the template image.

A selection of one of the reference images indicating a selected reference image is received (block 906). In one example, user interface module 146 receives a selection of one of the reference images, the selected reference images including a second location indicating where the selected reference image was captured and settings of a capture device used to capture the one of the reference images.

In one example, an image capture module is configured to extract first features from the template image, and a reference image module is configured to obtain ratings of the reference images and extract second features from the reference images to determine the reference images based on the first features matching the second features, the ratings, and respective locations of the reference images that are proximate to the first location. Additionally or alternatively, the respective locations of the reference images that are proximate to the first location can be given a higher priority in determining the reference images than the ratings and the first features matching the second features.

Directions from the first location to the second location are obtained (block 908). In one example, location module 148 obtains directions from the first location to the second location. Directions may include a map, step-by-step directions, combinations thereof, and the like.

A video stream is generated (block 910). The video stream is generated at the second location and includes the object included in the template image. In one example, video capture module 150 generates a video stream, the video stream generated at the second location and including the object included in the template image.

Interactive instructions are generated for adjusting a position of the computing device until a composition of the video stream aligns with a composition of the one of the reference images (block 912). In one example, composition instructions module 152 generates interactive instructions for adjusting a position of the computing device until a composition of the video stream aligns with a composition of the one of the reference images.

An additional image is captured according to the position with an image capture module (block 914). The additional image includes the object included in the template image, the image capture module configured based on the settings. In one example, image capture module 142 captures, according to the position, an additional image.

Figure 10:
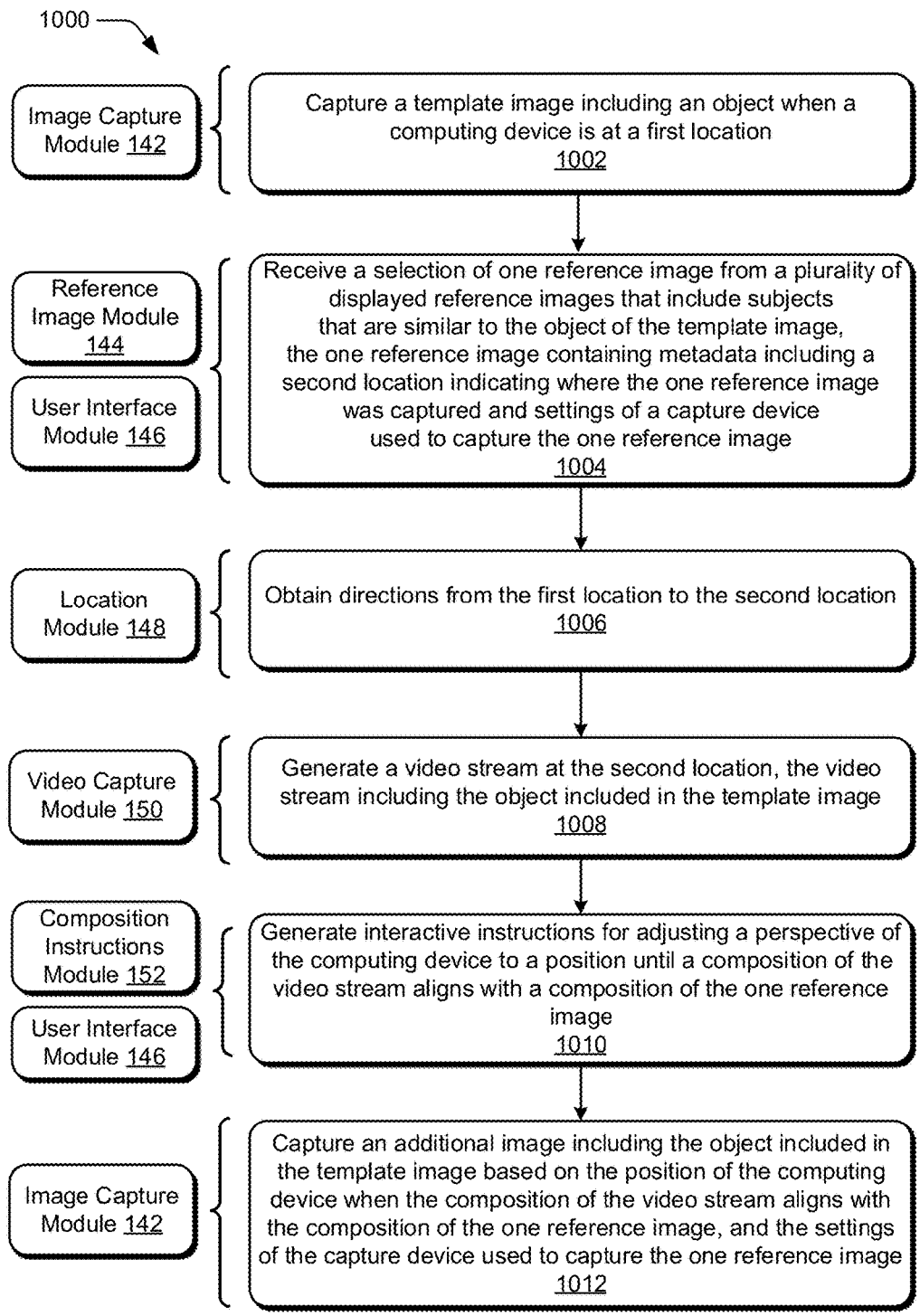
FIG. 10 illustrates a flow diagram depicting an example procedure in accordance with one or more aspects of the disclosure.

FIG. 10 illustrates an example procedure 1000 for providing image composition instruction based on reference image perspective, including instructing image composition when an image is captured based on reference image locations, in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 106 or server 120 of FIG. 1 that makes use of an image capture system, such as system 700 or image capture system 114. An image capture system implementing procedure 1000 may be an independent application that has been installed on the computing device, a service hosted by a service provider that is accessible by the computing device, a plug-in module to the computing device, or combinations thereof.

A template image including an object is captured when a computing device is at a first location (block 1002). In one example, image capture module 142 captures a template image including an object when the computing device is at a first location.

A selection of one reference image from a plurality of displayed reference images that include subjects that are similar to the object of the template image is received (block 1004). The one reference image contains metadata including a second location indicating where the one reference image was captured and settings of a capture device used to capture the one reference image. In one example, user interface module 146 receives a selection of one reference image from a plurality of displayed reference images, and reference image module 144 obtains reference images that include subjects that are similar to the object of the template image. Additionally or alternatively, reference images can include a same object as the object of the template image.

Directions from the first location to the second location are obtained (block 1006). In one example, location module 148 obtains directions from the first location to the second location.

A video stream is generated at the second location (block 1008). The video stream includes the object included in the template image. In one example, video capture module 150 generates a video stream at the second location.

Interactive instructions are generated for adjusting a perspective of the computing device to a position until a composition of the video stream aligns with a composition of the one reference image (block 1010). In one example, composition instructions module 152 generates interactive instructions for adjusting a perspective of the computing device to a position until a composition of the video stream aligns with a composition of the one reference image, and user interface module 146 exposes the interactive instructions. Additionally or alternatively, the adjusting a perspective of the computing device to a position comprises adjusting at least one of an elevation, a location, and a rotation about one or more axes of the computing device, and the settings include at least one of aperture, shutter speed, white balance, and ISO that measures a sensitivity of an image sensor of the computing device.

An additional image including the object included in the template image is captured based on the position of the computing device when the composition of the video stream aligns with the composition of the one reference image, and the settings of the capture device used to capture the one reference image (block 1012). In one example, image capture module captures an additional image, such as a composed image.

The procedures described herein constitutes an improvement over procedures that post-process images and do not provide instructions for composing an image at the time of image capture. The procedures described herein enable a user to capture a composed image having a same composition as a reference image at the time of image capture. For instance, a user can capture a composed image at a same location and with a camera in a same position and orientation, and configured with same configurations settings as a camera used to capture the reference image. Accordingly, not only do the procedures described herein enable a user to take a composed image having a desired composition, the procedures described herein teach a user in an interactive way (e.g., with interactive instructions to position a camera, directions to proper locations from which to take an image, and camera configuration settings) how to capture a well-composed image with subject matter selected by the user. Accordingly, the procedures described herein provide valuable photographic education without the expense in time and money of photography classes.

Having considered example procedures in accordance with one or more implementations, consider now example systems and devices that can be utilized to practice the inventive principles described herein.

Example Systems and Devices

FIG. 11 illustrates an example system generally at 1100 that includes an example computing device 1102 that is representative of one or more computing systems and devices that may implement the various techniques described herein. This is illustrated through inclusion of image capture system 114, system 700, image capture application 124, and image capture support system 122, which operate as described above. Computing device 1102 may be, for example, a user computing device (e.g., one of computing devices 106), or a server device of a service provider, (e.g., server 120). Furthermore, computing device 1102 may include an on-chip system, multiple computing devices, combinations thereof, or any other suitable computing device or computing system. Accordingly, FIG. 11 illustrates computing device 1102 as one or more of a tablet, a laptop computer, a smart phone, smart eye glasses, and a camera, though these examples are illustrative and in no way are meant to limit the type or number of devices included in computing device 1102.

The example computing device 1102 includes a processing system 1104, one or more computer-readable media 1106, and one or more I/O interfaces 1108 that are communicatively coupled to each other. Although not shown, computing device 1102 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1104 is representative of functionality to perform one or more operations using hardware. Accordingly, processing system 1104 is illustrated as including hardware elements 1110 that may be configured as processors, functional blocks, and so forth. This may include implementation in hardware as an application specific integrated circuit or other logic device formed using one or more semiconductors. Hardware elements 1110 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 128 in FIG. 1 are an example of processing system 1104.

Computer-readable storage media 1106 is illustrated as including memory/storage 1112. Storage 130 in FIG. 1 is an example of memory/storage included in memory/storage 1112. Memory/storage component 1112 may include volatile media (such as random access memory (RAM)), nonvolatile media (such as read only memory (ROM), Flash memory, optical disks, magnetic disks, and so forth), or combinations thereof. Memory/storage component 1112 may include fixed media (e.g., RAM, ROM, a fixed hard drive, and so on) as well as removable media (e.g., Flash memory, a removable hard drive, an optical disc, and so forth). Computer-readable media 1106 may be configured in a variety of other ways as further described below.

Input/output interface(s) 1108 are representative of functionality to allow a user to enter commands and information to computing device 1102, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1102 may be configured in a variety of ways as further described below to support user interaction.

Computing device 1102 also includes applications 1114. Applications 1114 are representative of any suitable applications capable of running on computing device 1102, and may include a web browser which is operable to access various kinds of web-based resources (e.g., assets, media clips, images, content, configuration files, services, user profiles, and the like). Applications 1114 include image capture application 124, as previously described. Furthermore, applications 1114 includes any applications supporting image capture system 114, system 700, and image capture support system 122.

Computing device 1102 also includes gyroscope 1116 configured to obtain gyroscope settings of computing device 1102, such as measures of angular movement about any number of axes. In one location, gyroscope 1116 includes a GPS receiver configured to determine a position of computing device 1102.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1102. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1110, or combinations thereof. Computing device 1102 may be configured to implement particular instructions and functions corresponding to the software and hardware modules. Accordingly, implementation of a module that is executable by computing device 1102 as software may be achieved at least partially in hardware, e.g., through use of computer-readable storage media and hardware elements 1110 of processing system 1104. The instructions and functions may be executable/operable by one or more articles of manufacture (for example, one or more computing devices 1102 or processing systems 1104) to implement techniques, modules, and examples described herein.

The techniques described herein may be supported by various configurations of computing device 1102 and are not limited to the specific examples of the techniques described herein. This functionality may also be implemented all or in part through use of a distributed system, such as over a "cloud" 1118 via a platform 1120 as described below.

Cloud 1118 includes and is representative of a platform 1120 for resources 1122. Platform 1120 abstracts underlying functionality of hardware (e.g., servers) and software resources of cloud 1118. Resources 1122 may include applications, data, or applications and data that can be utilized while computer processing is executed on servers that are remote from computing device 1102. Resources 1122 can also include services provided over the Internet, through a subscriber network, such as a cellular or Wi-Fi network, or combinations thereof. Resources 1122 can include asset store 1124, which stores assets, such as images, photographs (e.g., user images in a gallery, a database of stock photographs, search results including photographs, and the like), document templates, user profile data, user image libraries, such as photographs posted in a shared photo service, and the like, and may be accessed by computing device 1102.

Platform 1120 may abstract resources and functions to connect computing device 1102 with other computing devices. Platform 1120 may also serve to abstract scaling of resources to provide a corresponding level of scale to encountered demand for resources 1122 that are implemented via platform 1120. Accordingly, in an interconnected device embodiment, implementation of functionality described herein may be distributed throughout system 1100. For example, the functionality may be implemented in part on computing device 1102 as well as via platform 1120 that abstracts the functionality of cloud 1118.

CONCLUSION

In one or more implementations, a digital medium environment includes at least one computing device. Systems and techniques are described herein for providing image composition instruction based on reference image perspective. A template image of a desired object is captured, such as a building or historic monument. Reference images matching the template image are obtained, such as by matching content features of the template image to the reference images, respective locations of where the reference images were captured, user ratings of the reference images, and the like. Directions from a first location of where a template image was captured to a second location where a selected reference image was captured are obtained and exposed in a user interface to allow a user to move to the second location. At the second location, interactive instructions are generated based on a live video stream of the desired object and the selected reference image to move a camera capturing the video stream until a composition of the video stream is aligned with a composition of the reference image. The camera is configured with settings, such as aperture and shutter speed, based on the reference image, to capture a composed image having a same composition as the reference image.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to capture digital images, a method implemented by a computing device having an integrated camera device, the method comprising:

capturing, by the camera device, a digital image of an object as a template image depicting the object from an initial perspective;

displaying reference images depicting subjects that are similar to the object captured in the template image;

receiving a selection of one of the reference images indicating a selected reference image;

determining that a location of the computing device is proximate a perspective location associated with the selected reference image;

displaying instructions to adjust the initial perspective of the computing device to a position that aligns a composition of an image preview of the object with a composition of the selected reference image, the instructions including a first indicator of the composition of the image preview and a second indicator of the composition of the selected reference image;

adjusting at least one of the first indicator or the second indicator to indicate a direction to move the computing device to the position; and capturing, by the camera device according to the position, an additional digital image of the object captured in the template image.

2. The method as described in claim 1, further comprising:
determining that the location of the computing device does not match the perspective location associated with the selected reference image; and
displaying the instructions to include directions from the location of the computing device to the perspective location associated with the selected reference image.

3. The method as described in claim 2, wherein the directions include an estimate of time to travel from the location of the computing device to the perspective location associated with the selected reference image.

4. The method as described in claim 2, wherein the directions include a map from the location of the computing device to the perspective location associated with the selected reference image.

5. The method as described in claim 1, wherein the image preview of the object includes a video stream of the object.

6. The method as described in claim 1, wherein the reference images that are displayed are determined based on determining that the subjects depicted in the reference images are a same object as the object captured in the template image.

7. The method as described in claim 1, wherein the reference images that are displayed are determined based at least in part on respective ratings of the reference images, wherein the respective ratings indicate a relative amount of approval of the reference images.

8. The method as described in claim 1, further comprising:
extracting features from the template image; and
extracting additional features from the reference images; and
wherein the reference images that are displayed are determined based at least in part on matching the features from the template image to the additional features from the reference images.

9. The method as described in claim 1, wherein the displaying the instructions further includes changing one of the first indicator and the second indicator when the composition of the image preview matches the composition of the selected reference image.

10. The method as described in claim 1, further comprising:
extracting first features from the image preview;
extracting second features from the selected reference image; and
determining a homography matrix to map respective ones of the first features from the image preview to the second features from the selected reference image; and
wherein the second indicator is displayed based on the homography matrix.

11. The method as described in claim 1, further comprising determining gyroscopic settings of the computing device; and
wherein the first indicator is displayed based on the gyroscopic settings.

12. The method as described in claim 1, wherein the instructions are interactive and received until the composition of the image preview matches the composition of the selected reference image determined by aligning the first indicator with the second indicator.

13. The method as described in claim 1, further comprising adding a shape to at least one of the first indicator or the second indicator to indicate alignment of the composition of the image preview and the composition of the selected reference image.

14. In a digital medium environment to capture images, a system implemented by a computing device, the system including modules implemented at least partially in hardware of the computing device, the system comprising:
an image capture module to capture a template image including an object when the computing device is at a first location;
a reference image module to obtain reference images including subjects that are similar to the object captured in the template image;
a user interface module to receive a selection of one of the reference images indicating a selected reference image, the selected reference image including a second location indicating where the selected reference image was captured and settings of a capture device used to capture the selected reference image;
a location module to obtain directions from the first location to the second location;
a video capture module to generate a video stream, the video stream generated at the second location and including the object included in the template image;
a composition instructions module to generate interactive instructions for adjusting a position of the computing device until a composition of the video stream aligns with a composition of the selected reference image;
the composition instructions module to configure, responsive to the composition of the video stream aligning with the composition of the selected reference image, the image capture module based on the settings; and
the image capture module to capture, according to the position and based on the settings, an additional image including the object included in the template image.

15. The system as described in claim 14, wherein the image capture module is further configured to extract first features from the template image, and the reference image module is further configured to obtain ratings of the reference images and extract second features from the reference images to determine the reference images based on:
the first features matching the second features;
the ratings; and
respective locations of the reference images that are proximate to the first location.

16. The system as described in claim 15, wherein the respective locations of the reference images that are proximate to the first location are given a higher priority in determining the reference images than the ratings and the first features matching the second features.

17. The system as described in claim 14, wherein the reference images include metadata including respective binary indicators that indicate whether the reference images include location data indicating where the reference images were captured.

18. In a digital medium environment to capture images, a method implemented by a computing device, the method comprising:

a step for capturing a template image including an object when the computing device is at a first location;

a step for receiving a selection of one reference image from a plurality of displayed reference images that include subjects that are similar to the object of the template image, the one reference image containing metadata including a second location indicating where the one reference image was captured and settings of a capture device used to capture the one reference image, the one reference image being displayed in an order of the plurality of displayed reference images based on a distance between the first location and the second location;

a step for obtaining directions from the first location to the second location;

a step for generating a video stream at the second location, the video stream including the object included in the template image;

a step for generating interactive instructions for adjusting a perspective of the computing device to a position until a composition of the video stream aligns with a composition of the one reference image; and a step for capturing an additional image including the object included in the template image based on:

the position of the computing device when the composition of the video stream aligns with the composition of the one reference image; and the settings of the capture device used to capture the one reference image.

19. The method as described in claim 18, wherein the adjusting the perspective of the computing device to the position comprises adjusting at least one of an elevation, a location, and a rotation about one or more axes of the computing device, and the settings include at least one of aperture, shutter speed, white balance, and ISO that measures a sensitivity of an image sensor of the computing device.

20. The method as described in claim 18, wherein the order of the plurality of displayed reference images is further based on whether the displayed reference images were taken by a professional photographer or an amateur photographer.

* * * * *